United States Patent
Han et al.

(10) Patent No.: US 11,363,577 B2
(45) Date of Patent: *Jun. 14, 2022

(54) METHOD AND APPARATUS FOR TRANSMITTING CONTROL INFORMATION IN A WIRELESS COMMUNICATION SYSTEM

(71) Applicant: LG Electronics Inc., Seoul (KR)

(72) Inventors: Seunghee Han, Seoul (KR); Hyunsoo Ko, Seoul (KR); Jaehoon Chung, Seoul (KR); Moonil Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 166 days.

This patent is subject to a terminal disclaimer.

(21) Appl. No.: 16/793,848

(22) Filed: Feb. 18, 2020

(65) Prior Publication Data

US 2020/0187200 A1 Jun. 11, 2020

Related U.S. Application Data

(63) Continuation of application No. 16/114,670, filed on Aug. 28, 2018, now Pat. No. 10,588,115, which is a
(Continued)

(30) Foreign Application Priority Data

Jan. 12, 2011 (KR) .......................... 10-2011-0003085

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1861* (2013.01); *H04L 5/001* (2013.01);
(Continued)

(58) Field of Classification Search
CPC ............ H04W 72/0413; H04W 52/14; H04W 52/146; H04W 52/54; H04W 72/0406;
(Continued)

(56) References Cited

U.S. PATENT DOCUMENTS

2008/0232449 A1* 9/2008 Khan ................ H04L 25/03343
375/220
2009/0129259 A1 5/2009 Malladi et al.
(Continued)

FOREIGN PATENT DOCUMENTS

| CN | 101000756 A | 7/2008 |
|---|---|---|
| JP | 2012506671 A | 3/2012 |

(Continued)

OTHER PUBLICATIONS

U.S. Appl. No. 16/114,670, filed Aug. 28, 2018.
(Continued)

*Primary Examiner* — Eric Myers
(74) *Attorney, Agent, or Firm* — Dentons US LLP

(57) ABSTRACT

The present invention relates to a wireless communication system. The present invention relates to a method for transmitting ACK/NACK in a wireless communication system in which carrier aggregation is set, and an apparatus therefor. Specifically, the present invention relates to an ACK/NACK transmission method and an apparatus therefor, the method comprising the steps of: receiving information on a plurality of physical uplink control channel (PUCCH) resources via upper layer signaling; receiving a transmit power control (TPC) field on a secondary carrier through a physical downlink control channel (PDCCH); receiving data indicated by the PDCCH; and transmitting ACK/NACK for the data, wherein the ACK/NACK is trans-
(Continued)

mitted using a PUCCH resource which is indicated by the value of the TPC field among the plurality of PUCCH resources.

18 Claims, 31 Drawing Sheets

Related U.S. Application Data continuation of application No. 15/630,397, filed on Jun. 22, 2017, now Pat. No. 10,097,328, which is a continuation of application No. 14/566,310, filed on Dec. 10, 2014, now Pat. No. 9,756,619, which is a continuation of application No. 13/583,577, filed as application No. PCT/KR2011/002631 on Apr. 13, 2011, now Pat. No. 8,964,674.

(60) Provisional application No. 61/360,427, filed on Jun. 30, 2010, provisional application No. 61/333,264, filed on May 11, 2010, provisional application No. 61/332,167, filed on May 6, 2010.

(51) Int. Cl.

| | | |
|---|---|---|
| *H04L 1/18* | (2006.01) | |
| *H04W 52/14* | (2009.01) | |
| *H04W 52/54* | (2009.01) | |
| *H04W 52/48* | (2009.01) | |
| *H04W 88/02* | (2009.01) | |
| *H04W 88/08* | (2009.01) | |

(52) U.S. Cl.
CPC .......... *H04L 5/0053* (2013.01); *H04L 5/0055* (2013.01); *H04W 52/14* (2013.01); *H04W 52/146* (2013.01); *H04W 52/54* (2013.01); *H04W 72/0406* (2013.01); *H04W 72/0473* (2013.01); *H04L 5/0091* (2013.01); *H04W 52/48* (2013.01); *H04W 88/02* (2013.01); *H04W 88/08* (2013.01)

(58) Field of Classification Search
CPC . H04W 72/0473; H04W 52/48; H04W 88/02; H04W 88/08; H04L 1/1861; H04L 5/001; H04L 5/0053; H04L 5/0055; H04L 5/0091

See application file for complete search history.

(56) References Cited

U.S. PATENT DOCUMENTS

| | | |
|---|---|---|
| 2009/0241004 A1 | 9/2009 | Ahn et al. |
| 2009/0245194 A1 | 10/2009 | Damnjanovic et al. |
| 2009/0290538 A1 | 11/2009 | Kim et al. |
| 2010/0015967 A1 | 1/2010 | Perets et al. |
| 2010/0098012 A1 | 4/2010 | Bala et al. |
| 2011/0116454 A1 | 5/2011 | Chen et al. |
| 2011/0261858 A1 | 10/2011 | Baldemair .......... H04J 11/0033 375/130 |

FOREIGN PATENT DOCUMENTS

| | | |
|---|---|---|
| KR | 10-0905385 A | 6/2009 |
| WO | 2009154839 A2 | 12/2009 |
| WO | 2010048142 A1 | 4/2010 |
| WO | 2010050371 A1 | 5/2010 |
| WO | 2010080922 A2 | 7/2010 |
| WO | 2010106786 A1 | 9/2010 |

OTHER PUBLICATIONS

U.S. Appl. No. 15/630,397, filed Jun. 22, 2017.
U.S. Appl. No. 14/566,310, filed Dec. 10, 2014 (U.S. Pat. No. 9,756,619).
U.S. Appl. No. 13/583,577, filed Sep. 7, 2012 (U.S. Pat. No. 8,964,674).
Pantech: "On the cross-carrier CFI signaling by PDCCH", 3GPP TSG-RAN WG1 #61, R1-102834, May 10-14, 2010.
Samsung: "PUCCH HARQ-ACK Resource Indexing for DL CA", 3GPP TSG RAN WG1 #61, R1-103002, May 10-14, 2010.
NTT DoCoMo: "Uplink ACK/NACK Resource Assignments for Carrier Aggregation", 3GPP TSG RAN WG1 Meeting #61, R1-103249, Oct. 10-14, 2010.
Huawei, UL ACK/NACK design for carrier aggregation, 3GPP TSG RAN WG1 Meeting #60bis, R1-101943, Apr. 16, 2010.
NTT Docome, Comparison of PDCCH transmission and coding schemes for LTE-Advanced, 3GPP TSG RAN WG1 Meeting #56, R1-090895, Feb. 13, 2009.
ZTE, Primary and secondary PDCH design for LTE-A, 3GPP TSG RAN WG1 Meeting #57, R1-092227, May 8, 2009.

\* cited by examiner

FIG. 5
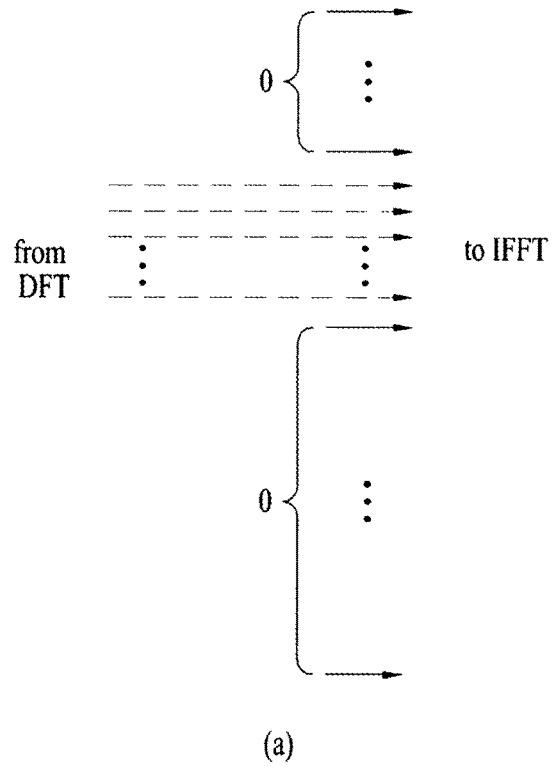
(a)
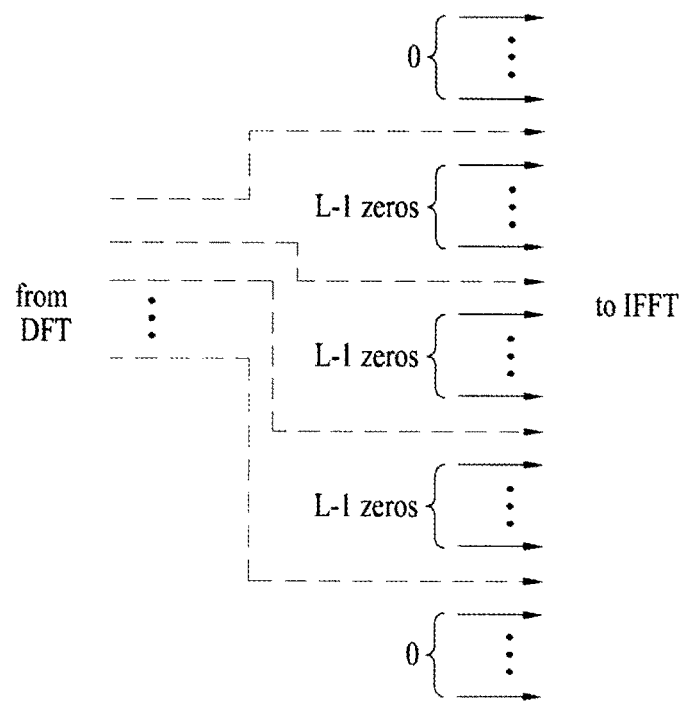
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (normal CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | 13 | | 6 | 13 |
| 3 | 2 | 1 | 7 | 14 | 1 | 7 | 14 |
| 4 | 3 | 2 | 8 | 15 | 2 | 8 | 15 |
| 5 | 4 | 3 | 9 | 16 | 3 | 9 | 16 |
| 6 | 5 | 4 | 10 | 17 | 4 | 10 | 17 |
| 7 | 6 | 5 | 11 | | 5 | 11 | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{\{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cyclic shift value of a CAZAC sequence
n'  ACK/NACK resource index used for the channelization in a RB Cell-specific
Cyclic shift value of
CAZAC sequence

FIG. 18

Reuse of LTE PUCCH format 2 structure (normal CP case)

Reuse of LTE PUCCH format 2 structure (extended CP case)

METHOD AND APPARATUS FOR TRANSMITTING CONTROL INFORMATION IN A WIRELESS COMMUNICATION SYSTEM

CROSS-REFERENCE TO RELATED APPLICATIONS

This application is a Continuation Application of U.S. patent application Ser. No. 16/114,670, filed Aug. 28, 2018 which is a Continuation Application of U.S. patent application Ser. No. 15/630,397 filed Jun. 22, 2017, which is a Continuation Application of U.S. patent application Ser. No. 14/566,310 filed Dec. 10, 2014, now issued as U.S. Pat. No. 9,756,619 issued Sep. 5, 2017, which is a Continuation Application of U.S. application Ser. No. 13/583,577 filed Sep. 7, 2012, now issued as U.S. Pat. No. 8,964,674 issued Feb. 24, 2015, which claims the benefit of PCT Application No. PCT/KR2011/002631 filed on Apr. 13, 2011, which claims the benefit of U.S. Provisional Application No. 61/332,167 filed May 6, 2010, U.S. Provisional Application No. 61/333,264 filed May 11, 2010, U.S. Provisional Application No. 61/360,427 filed Jun. 30, 2010, and Korean Patent No. 10-2011-0003085 filed Jan. 12, 2011, all of which are hereby incorporated by reference as if fully set forth herein.

TECHNICAL FIELD

The present invention relates to a wireless communication system and, more particularly, to a method and apparatus for transmitting control information. The wireless communication system can support carrier aggregation (CA).

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for efficiently transmitting control information in a wireless communication system. Another object of the present invention is to provide a channel format, signal processing method and apparatus for efficiently transmitting control information. Another object of the present invention is to provide a method and apparatus for efficiently allocating resources for transmitting control information.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

In accordance with one aspect of the present invention, a method for, at a user equipment (UE), transmitting acknowledgement/negative ACK (ACK/NACK) in a wireless communication system in which carrier aggregation is configured includes: receiving information on a plurality of physical uplink control channel (PUCCH) resources through higher layer signaling; receiving a transmit power control (TPC) field through a physical downlink control channel (PDCCH) on a secondary carrier; receiving data indicated by the PDCCH; and transmitting ACK/NACK for the data, wherein the ACK/NACK is transmitted using a PUCCH resource which is indicated by a value of the TPC field, from among the plurality of PUCCH resources.

The TPC field may be composed of 2 bits and the value of the TPC field may indicates one of 4 PUCCH resources configured by a higher layer.

The value of the TPC field may be set to the same value in a plurality of PDCCHs received through a plurality of secondary carriers.

The ACK/NACK may include multiple ACK/NACKs for a plurality of data, wherein the multiple ACK/NACKs are transmitted through a single PUCCH resource.

The PUCCH resource may include at least one of a physical resource block index and an orthogonal code index.

The transmitting ACK/NACK may include spreading ACK/NACK information corresponding to one single carrier frequency division multiple access (SC-FDMA) symbol such that the spread ACK/NACK information corresponds to a plurality of SC-FDMA symbols; and discrete Fourier transform (DFT)-precoding the spread ACK/NACK information on an SC-FDMA symbol basis.

In accordance with another embodiment of the present invention, a UE configured to transmit ACK/NACK in a wireless communication system in which carrier aggregation is configured includes a radio frequency (RF) unit; and a processor, wherein the processor is configured to receive information on a plurality of PUCCH resources through higher layer signaling, to receive a TPC field on a secondary carrier through a PDCCH, to receive data indicated by the PDCCH and to transmit ACK/NACK for the data, wherein the ACK/NACK is transmitted using a PUCCH resource which is indicated by a value of the TPC field, from among the plurality of PUCCH resources.

The TPC field may be composed of 2 bits and the value of the TPC field may indicate one of 4 PUCCH resources configured by a higher layer.

The TPC field may be set to the same value in a plurality of PDCCHs received through a plurality of secondary carriers.

The ACK/NACK may include multiple ACK/NACKs for a plurality of data, wherein the multiple ACK/NACKs are transmitted through a single PUCCH resource.

The PUCCH resource may include at least one of a physical resource block index and an orthogonal code index.

To transmit the ACK/NACK, the processor may be configured to spread ACK/NACK information corresponding to one SC-FDMA symbol such that the spread ACK/NACK information corresponds to a plurality of SC-FDMA symbols and to discrete Fourier transform (DFT)-precode the spread ACK/NACK information on an SC-FDMA symbol basis.

Advantageous Effects

According to embodiments of the present invention, control information can be efficiently transmitted in a wireless communication system. Furthermore, a channel format and a signal processing method for efficiently transmitting control information can be provided. In addition, resources for control information transmission can be efficiently allocated.

It will be appreciated by persons skilled in the art that the effects that could be achieved with the present invention are not limited to what has been particularly described hereinabove and these and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a signal mapping scheme in a frequency domain, which satisfies single carrier property;

FIG. 17 illustrates ACK/NACK channelization for PUCCH formats 1a and 1b;

FIG. 18 illustrates channelization for a hybrid structure of PUCCH formats 1/1a/1b and 2/2a/2b in the same PRB;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA can be implemented as a wireless technology such as Universal Terrestrial Radio Access (UTRA) or CDMA2000. TDMA can be implemented as a wireless technology such as Global System for Mobile communications (GSM)/General Packet Radio Service (GPRS)/Enhanced Data Rates for GSM Evolution (EDGE). OFDMA can be implemented as a wireless technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA. LTE-Advanced (LTE-A) is an evolution of 3GPP LTE. While the following description is given, centering on 3GPP LTE/LTE-A for clarity of description, this is purely exemplary and thus should not be construed as limiting the present invention.

In a wireless communication system, a UE receives information from a BS through downlink and transmits information to the BS through uplink. Information transmitted and received between the BS and the UE includes data and various types of control information. Various physical channels are present according to type/usage of information transmitted and received between the BS and the UE.

Figure 1:
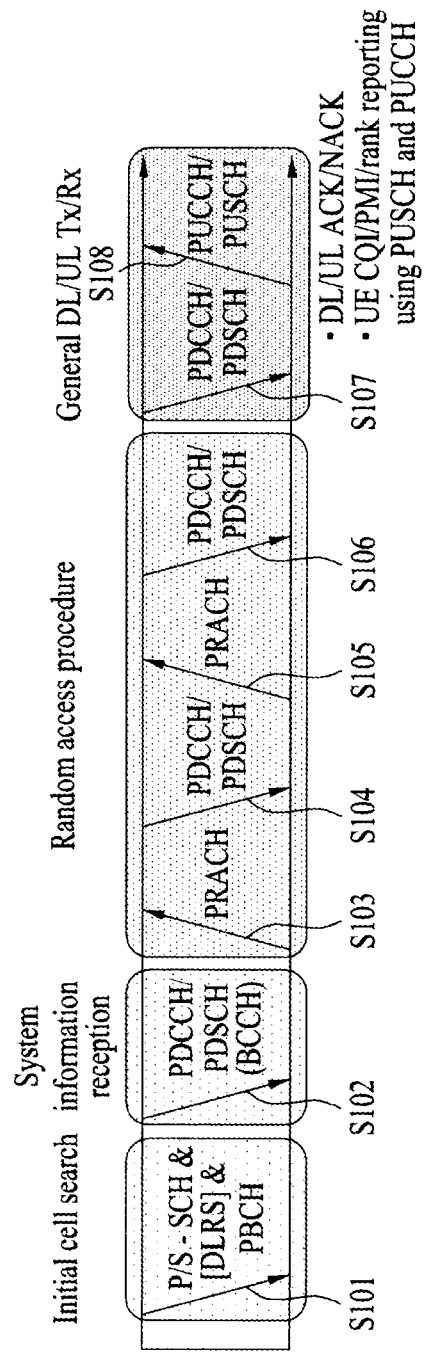
FIG. 1 illustrates physical channels used in a 3GPP LTE system, one of wireless communication systems, and a general signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE may be synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a physical broadcast channel. In the mean time, the UE may check a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for the preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indication (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
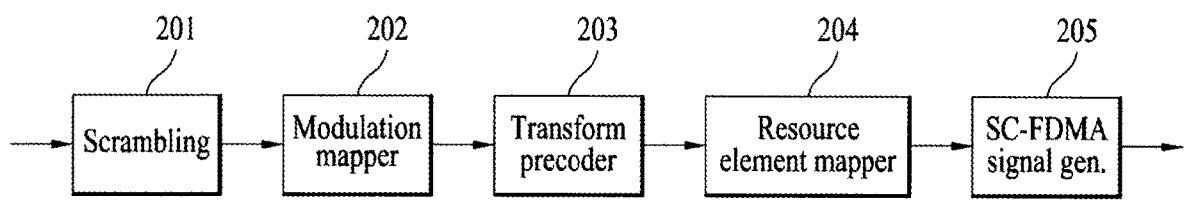
FIG. 2 illustrates an uplink signal processing procedure.

FIG. 2 illustrates a signal processing procedure through which a UE transmits an uplink signal.

To transmit the uplink signal, a scrambling module 210 of the UE may scramble the uplink signal using a UE-specific scramble signal. The scrambled signal is input to a modulation mapper 220 in which the scrambled signal is modulated into complex symbols using Binary Phase Shift Keying (BPSK), Quadrature Phase Shift Keying (QPSK) or 16-Quadrature amplitude Modulation (QAM)/64-QAM according to signal type and/or channel status. The modulated complex symbols are processed by a transform precoder 230, and then applied to a resource element mapper 240. The resource element mapper 240 may map the complex symbols to time-frequency resource elements. The signal processed in this manner may be subjected to an SC-FDMA signal generator 250 and transmitted to a BS through an antenna.

Figure 3:
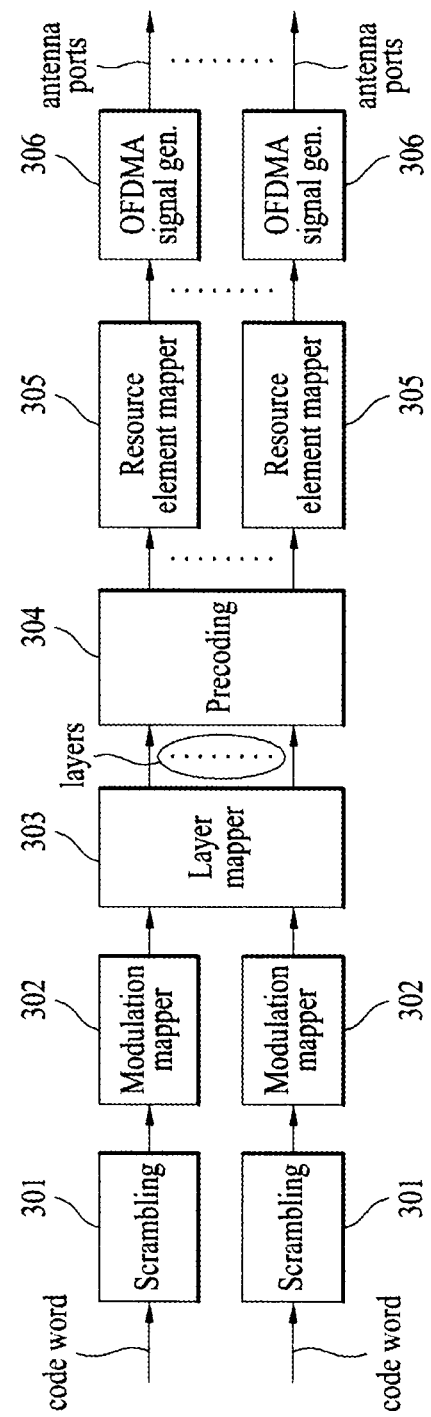
FIG. 3 illustrates a downlink signal processing procedure.

FIG. 3 illustrates a signal processing procedure through which the BS transmits a downlink signal.

In a 3GPP LTE system, the BS may transmit one or more codewords on downlink. The codewords may be processed into complex symbols through a scrambling module 301 and a modulation mapper 302 as in the uplink shown in FIG. 2. Then, the complex symbols are mapped to a plurality of layers by a layer mapper 303. The layers may be multiplied by a precoding matrix in a precoding module 304 and allocated to transport antennas. The processed signals for the respective antennas may be mapped to time-frequency resource elements by a resource element mapper 305 and subjected to an OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
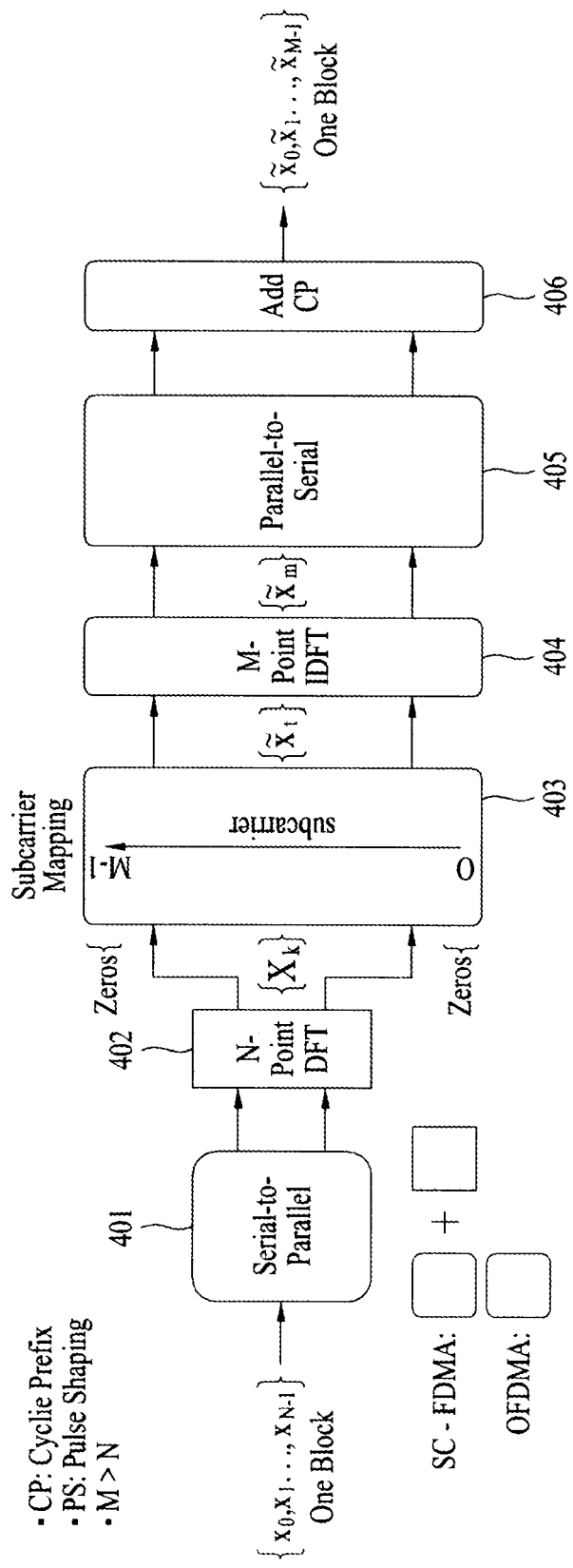
FIG. 4 illustrates SC-FDMA and OFDMA schemes.

FIG. 4 illustrates SC-FDMA and OFDMA schemes. The 3GPP system employs OFDMA in downlink and uses SC-FDMA in uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 offsets some of the IDFT effect of the M-point IDFT module 404 such that a transmitted signal has single carrier property.

FIG. 5 illustrates a signal mapping scheme in a frequency domain, which satisfies single carrier property. FIG. 5(a) illustrates a localized mapping scheme and FIG. 5B illustrates a distributed mapping scheme.

Clustered SC-FDMA, which is a modified version of SC-FDMA, will now be described. Clustered SC-FDMA divides DFT process output samples into sub-groups in a subcarrier mapping process and discretely maps the sub-groups to the frequency domain (or subcarrier domain).

Figure 6:
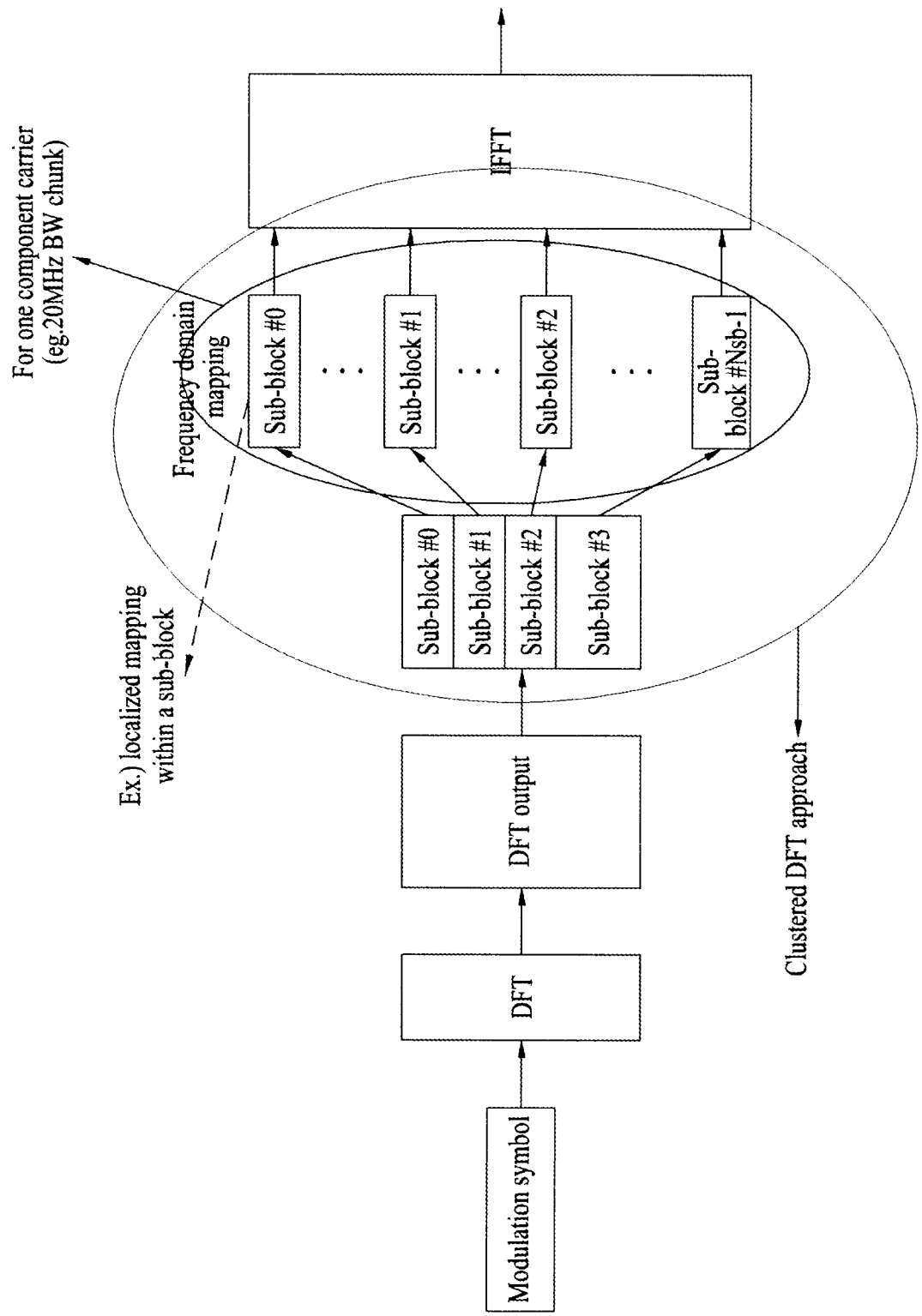
FIG. 6 illustrates a signal processing procedure of mapping DFT process output samples to a single carrier in clustered SC-FDMA.
Figure 7:
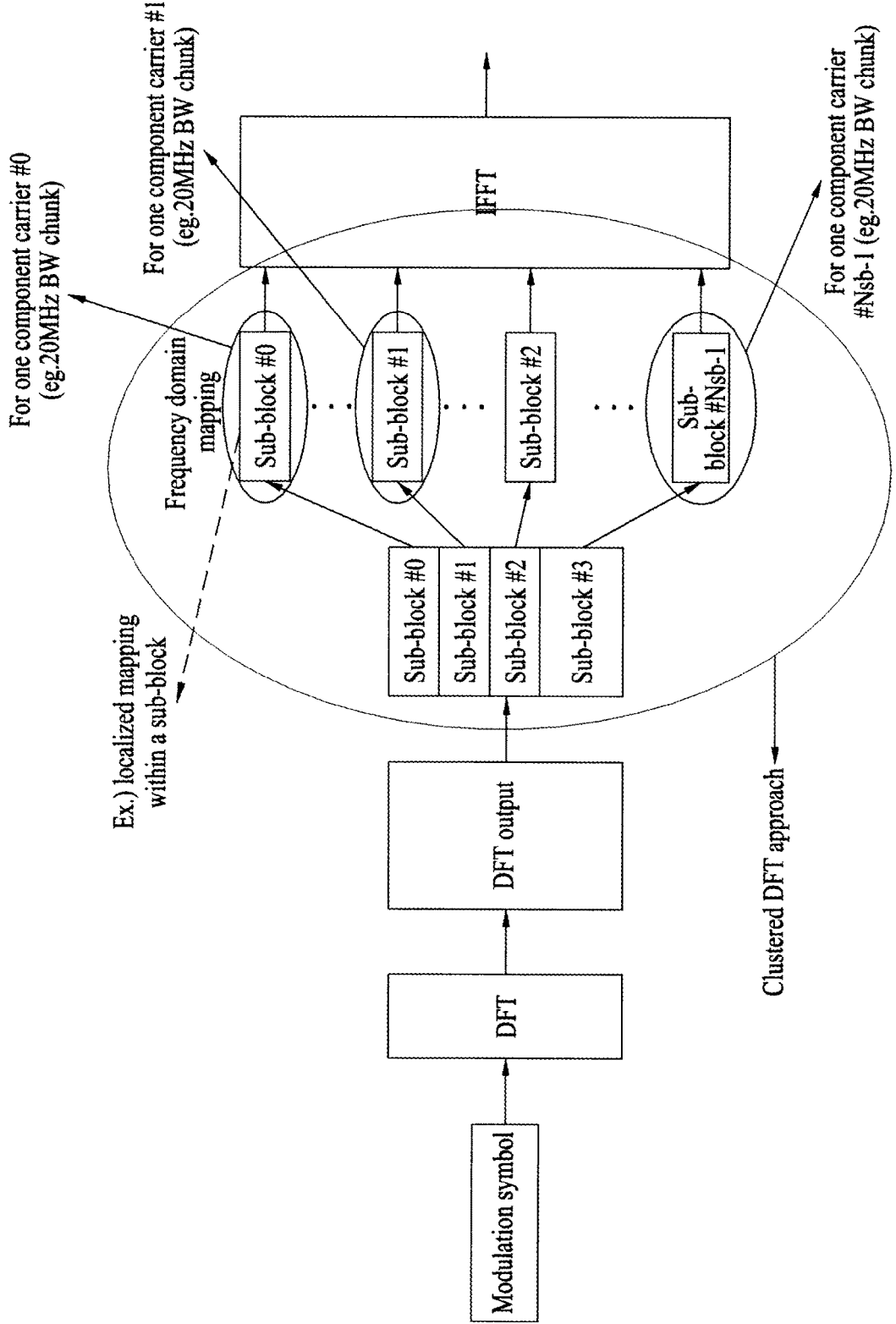
FIGS. 7 and 8 illustrate a signal processing procedure of mapping DFT process output samples to multiple carriers in clustered SC-FDMA.
Figure 8:
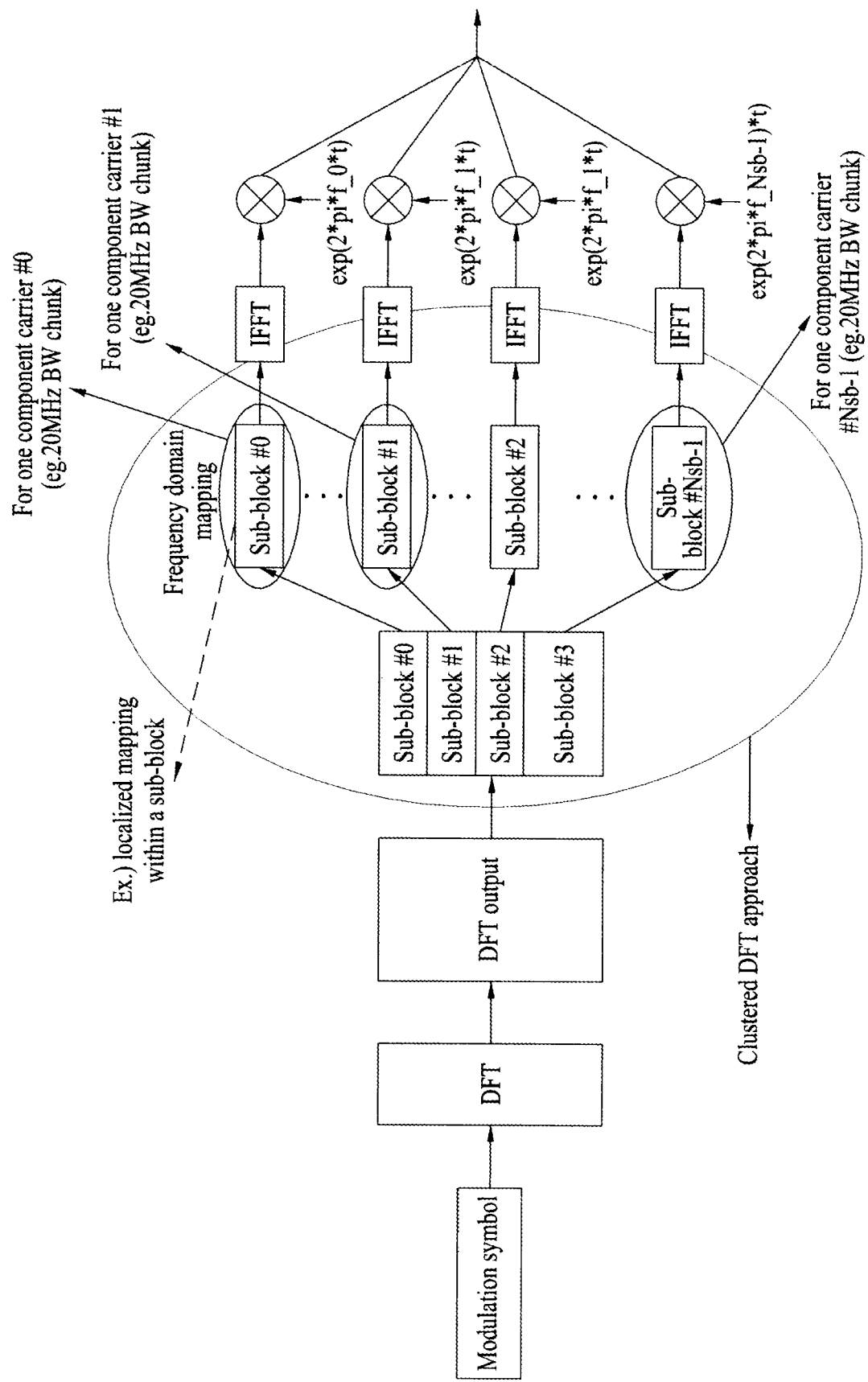

FIG. 6 illustrates a signal processing procedure for mapping DFT process output samples to a single carrier in clustered SC-FDMA. FIGS. 7 and 8 illustrate a signal processing procedure for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when subcarrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
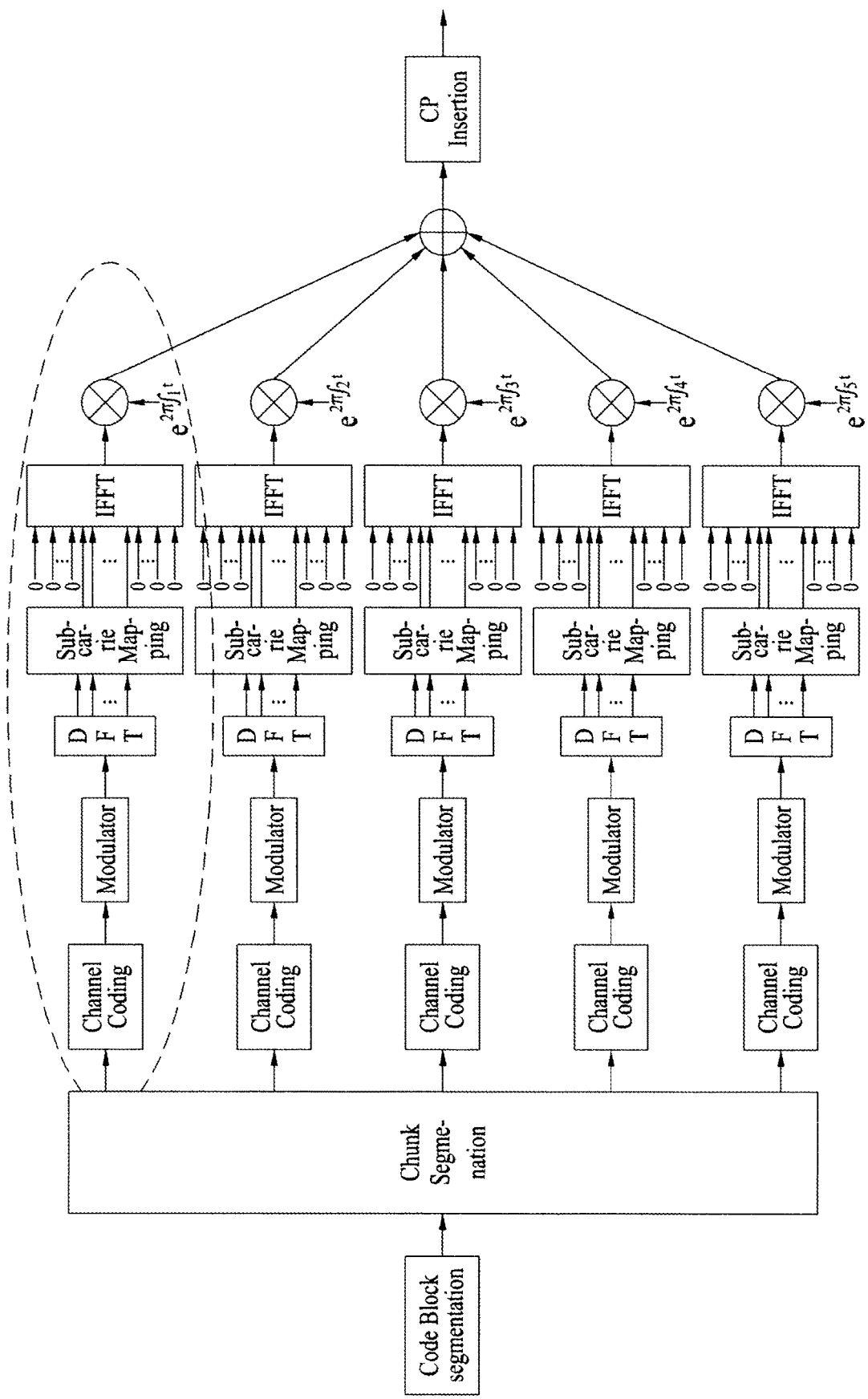
FIG. 9 illustrates a signal processing procedure in segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT spread OFDMA (NxDFT-s-OFDMA). Referring to FIG. 9, the segmented SC-FDMA is characterized in that total time-domain modulation symbols are divided into N groups (N is an integer larger than 1) and a DFT process is performed on a group-by-group basis to relieve the single carrier property constraint.

Figure 10:
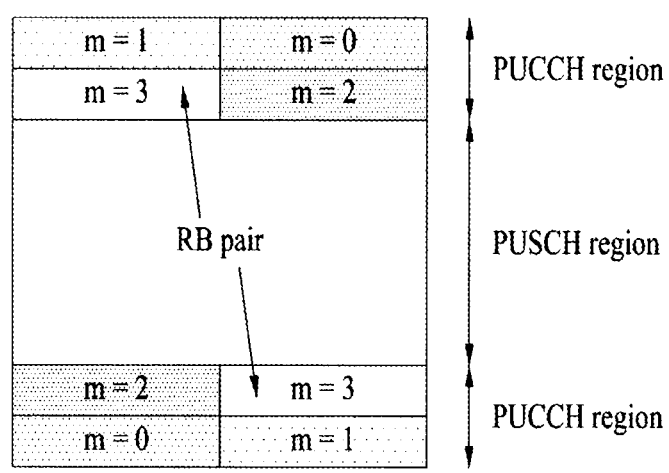
FIG. 10 illustrates an uplink subframe structure.

FIG. 10 illustrates an uplink subframe structure.

Referring to FIG. 10, an uplink subframe includes a plurality of slots (e.g. two slots). The slots may include different numbers of SC-FDMA symbols according to CP length. For example, the slot can include 7 SC-FDMA symbols in case of normal CP. The uplink subframe is divided into a data region and a control region. The data region includes a PUSCH and is used to transmit a data signal such as voice. The control region includes a PUCCH and is used to transmit uplink control information. The PUCCH includes RB pairs (e.g. 7 RB pairs in frequency mirrored positions, and m=0, 1, 2, 3, 4) located on both ends of the data region in the frequency domain and is hopped on a slot basis. The uplink control information (UCI) includes HARQ ACK/NACK, CQI, PMI, RI, etc.

Figure 11:
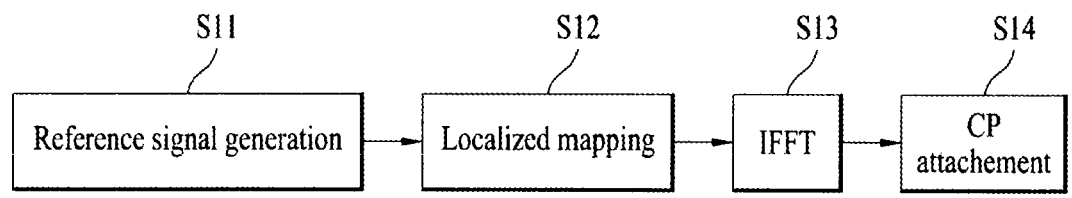
FIG. 11 illustrates a signal processing procedure for transmitting a reference signal (RS) on uplink.

FIG. 11 illustrates a signal processing procedure for transmitting a reference signal (RS) on uplink. While data is converted into a frequency domain signal through a DFT precoder, frequency-mapped, and then transmitted through IFFT, an RS does not passes the DFT precoder. Specifically, an RS sequence generated in the frequency domain (S11) is sequentially subjected to localization mapping (S12), IFFT (S13) and CP addition (S14) to be transmitted.

RS sequence $r_{u,v}^{(\alpha)}(n)$ is defined by cyclic shift $\alpha$ of a base sequence and may be represented by Equation 1.

$$r_{u,v}^{(\alpha)}(n)=e^{j\alpha n}\bar{r}_{u,v}(n), 0\leq n < M_{sc}^{RS}$$ [Equation 1]

Here, $M_{sc}^{RS}=mN_{sc}^{RB}$ denotes the length of the RS sequence, $N_{sc}^{RB}$ denotes a resource block size on a subcarrier basis, $1\leq m\leq N_{RB}^{max,UL}$, and $N_{RB}^{max,UL}$ represents a maximum uplink transmission bandwidth.

Base sequence $\bar{r}_{u,v}(n)$ is divided into several groups. $u\in\{0, 1, \ldots, 29\}$ denotes a group number and v corresponds to a base sequence number in a corresponding group. Each group includes one base sequence (v=0) having a length of $M_{sc}^{RS}=mN_{sc}^{RB}$ ($1\leq m\leq 5$) and two base sequences (v=0,1) having a length of $M_{sc}^{RB}=mN_{sc}^{RB}$ ($6\leq m\leq N_{RB}^{max,UL}$). The sequence group number u and base sequence number v in the corresponding group may vary with time. Base sequence $\bar{r}_{u,v}(0), \ldots, \bar{r}_{u,v}(M_{sc}^{RS}-1)$ is defined according to sequence length $M_{sc}^{RS}$.

A base sequence having a length of longer than $3N_{sc}^{RB}$ can be defined as follows.

For $M_{sc}^{RS}\geq 3N_{sc}^{RB}$, base sequence $\bar{r}_{u,v}(0), \ldots, \bar{r}_{u,v}(M_{sc}^{RS}-1)$ is given by the following Equation 2.

$$\bar{r}_{u,v}(n)=x_q(n \bmod N_{ZC}^{RS}), 0\leq n < M_{sc}^{RS}$$ [Equation 2]

Here, the q-th root Zadoff-Chu sequence can be defined by the following Equation 3.

$$x_q(m) = e^{-j\frac{\pi q m(m+1)}{N_{ZC}^{RS}}}, 0 \leq m \leq N_{ZC}^{RS} - 1$$ [Equation 3]

Here, q satisfies the following Equation 4.

$$q=\lfloor\bar{q}+1/1\rfloor+v\cdot(-1)^{\lfloor 2\bar{q}\rfloor}$$

$$\bar{q}=N_{ZC}^{RS}\cdot(u+1)/31$$ [Equation 4]

The length $N_{ZC}^{RS}$ of the Zadoff-Chue sequence is given by the largest prime number, and thus $N_{ZC}^{RS}<M_{sc}^{RS}$ is satisfied.

A base sequence having a length of less than $3N_{sc}^{RB}$ can be defined as follows. The base sequence is given by the following Equation 5 for $M_{sc}^{RS}=N_{sc}^{RB}$ and $M_{sc}^{RS}=2N_{sc}^{RB}$.

$$\bar{r}_{u,v}(n)=e^{j\varphi(n)\pi/4}, 0\leq n \leq M_{sc}^{RS}-1$$ [Equation 5]

Here, for $M_{sc}^{RS}=N_{sc}^{RB}$ and $M_{sc}^{RS}=2N_{sc}^{RB}$, $\varphi(n)$ is given as shown in Tables 1 and 2, respectively.

TABLE 1

| u | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | -3 | 1 | 1 | 1 | -3 | -3 | -3 | 1 | |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -1 | 3 | -3 | 1 | -3 | 3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | 1 | 1 | -1 | -1 | 3 | -1 | -3 | 3 | -3 | -3 | -3 | 1 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |

TABLE 2-continued

| u | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

RS hopping will now be described.

The sequence group number u in slot $n_s$ can be defined by group hopping pattern $f_{gh}(n_s)$ and a sequence-shift pattern $f_{ss}$ according to Equation 6.

$$u = (f_{gh}(n_s) + f_{ss}) \bmod 30 \quad \text{[Equation 6]}$$

Here, mod denotes a modulo operation.

There are 17 different hopping patterns and 30 different sequence-shift patterns. Sequence group hopping may be enabled or disabled by means of a parameter that enables group hopping and is provided by higher layers.

PUCCH and PUSCH have the same hopping pattern but may have different sequence-shift patterns.

The group hopping pattern $f_{gh}(n_s)$ is the same for PUSCH and PUCCH and given by the following Equation 7.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases} \quad \text{[Equation 7]}$$

Here, c(i) corresponds to a pseudo-random sequence and the pseudo-random sequence generator may be initialized with $$c_{init} = \left\lfloor \frac{N_{ID}^{cell}}{30} \right\rfloor$$

at the beginning of each radio frame.

Sequence-shift pattern $f_{ss}$ differs between PUCCH and PUSCH.

For PUCCH, sequence-shift pattern $f_{ss}^{PUCCH}$ is given by $f_{ss}^{PUCCH} = N_{ID}^{cell} \bmod 30$. For PUSCH, sequence shift pattern $f_{ss}^{PUSCH}$ is given by $f_{ss}^{PUSCH} = (f_{ss}^{PUCCH} + \Delta_{ss}) \bmod 30$. $\Delta_{ss} \in \{0, 1, \ldots, 29\}$ is configured by higher layers.

Sequence hopping will now be described.

Sequence hopping only applies for reference signals of length $M_{sc}^{RS} \geq 6N_{sc}^{RB}$.

For reference signals of length $M_{sc}^{RS} < 6N_{sc}^{RB}$, the base sequence number v within the base sequence group is given by v=0.

For reference signals of length $M_{sc}^{RS} < 6N_{sc}^{RB}$, the base sequence number v within the base sequence group in slot $n_s$ is given by the following Equation 8.

$$v = \begin{cases} c(n_s) & \text{if group hopping is disabled and sequence hopping is enabled} \\ 0 & \text{otherwise} \end{cases} \quad \text{[Equation 8]}$$

Here, c(i) corresponds to the pseudo-random sequence and a parameter that is provided by higher layers and enables sequence hopping determines if sequence hopping is enabled or not. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

A reference signal for PUSCH is determined as follows.

Reference signal sequence $r^{PUSCH}(\cdot)$ for PUSCH is defined by $r^{PUSCH}(m \cdot M_{sc}^{RS} + n) = r_{u,v}^{(\alpha)}(n)$ where $$m = 0, 1$$

$$n = 0, \ldots, M_{sc}^{RS} - 1$$

and $M_{sc}^{RS} = M_{sc}^{PUSCH}$.

A cyclic shift is given by $\alpha = 2 \pi n_{cs}/12$ and $n_{cs} = (n_{DMRS}^{(1)} + n_{DMRS}^{(2)} + n_{PRS}(n_s)) \bmod 12$ in one slot.

Here, $n_{DMRS}^{(1)}$ is a broadcast value, $n_{DMRS}^{(2)}$ is given by uplink scheduling allocation, and $n_{PRS}(n_s)$ is a cell-specific cyclic shift value. $n_{PRS}(n_s)$ varies with slot number $n_s$ and is given by $n_{PRS}(n_s) = \sum_{i=0}^{7} c(8 \cdot n_s + i) \cdot 2^i$.

Here, c(i) denotes the pseudo-random sequence and is a cell-specific value. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

Table 3 shows a cyclic shift field and $n_{DMRS}^{(2)}$ in downlink control information (DCI) format 0.

TABLE 3

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in a PUSCH will now be described.

The sequence is multiplied with the amplitude scaling factor $\beta_{PUSCH}$ and mapped to the same set of a physical resource block (PRB) used for the corresponding PUSCH in a sequence starting with $r^{PUSCH}(0)$. Mapping to resource elements (k,l), with l=3 for normal CP and l=2 for extended CP, in the subframe will be in increasing order of first k, then the slot number.

In summary, a ZC sequence is used with cyclic extension for length $3N_{sc}^{RB}$ or larger, whereas a computer generated sequence is used for length less than $3N_{sc}^{RB}$. A cyclic shift is determined according to cell-specific cyclic shift, UE-specific cyclic shift and hopping pattern.

Figure 12A:
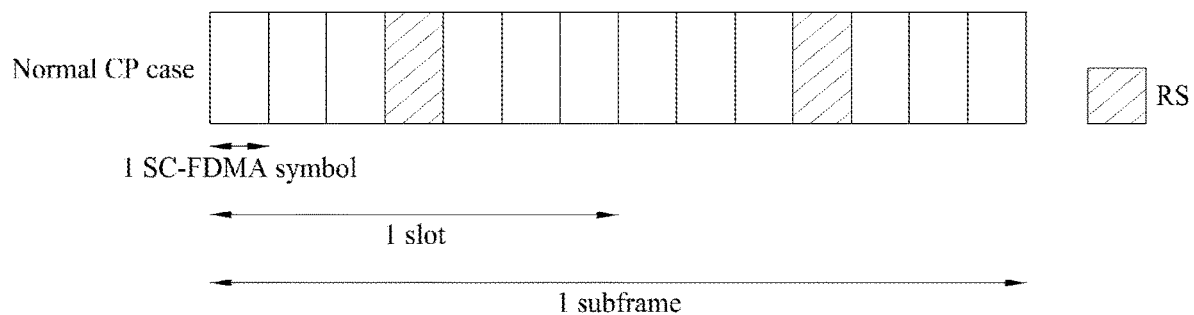
FIGS. 12$a$-12$b$ illustrate a demodulation reference signal (DMRS) structure for a PUSCH.
Figure 12B:
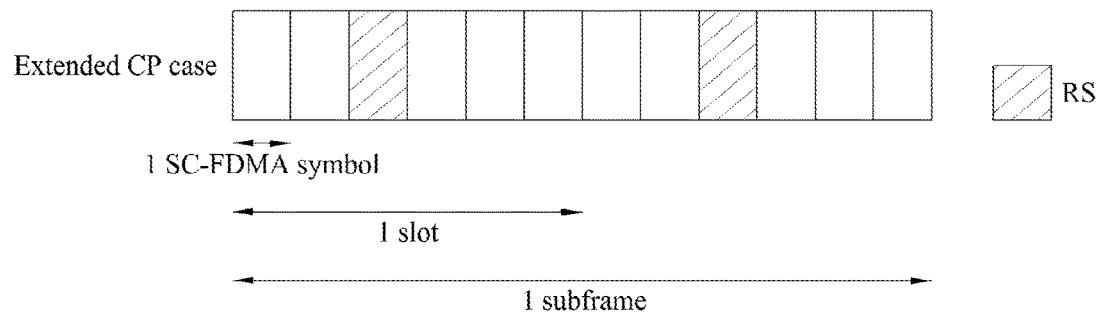

FIG. 12a shows a DMRS structure for PUSCH in case of normal CP and FIG. 12b shows a DMRS structure for PUSCH in case of extended CP. A DMRS is transmitted through the fourth and eleventh SC-FDMA symbols in FIG. 12a and transmitted through the third and ninth SC-FDMA symbols in FIG. 12b.

FIGS. 13 to 16 illustrate slot level structures of PUCCH formats. A PUCCH has the following formats in order to transmit control information.

(1) Format 1: on-off keying (OOK) modulation, used for scheduling request (SR).

(2) Formats 1a and 1b: used for ACK/NACK transmission.

1) Format 1a: BPSK ACK/NACK for one codeword

2) Format 1b: QPSK ACK/NACK for two codewords (3) Format 2: QPSK modulation, used for CQI transmission.

(4) Formats 2a and 2b: used for simultaneous transmission of CQI and ACK/NACK

Table 4 shows modulation schemes according to PUCCH format and the number of bits per subframe. Table 5 shows the number of RSs per slot according to PUCCH format and Table 6 shows SC-FDMA symbol position in an RS according to PUCCH format. In Table 4, PUCCH formats 2a and 2b correspond to normal CP.

TABLE 4

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol position in RS | |
|---|---|---|
| | Normal CP | Extended CP |
| 1, 1a, 1b | 2, 3, 4 | 2, 3 |
| 2, 2a, 2b | 1, 5 | 3 |

Figure 13:
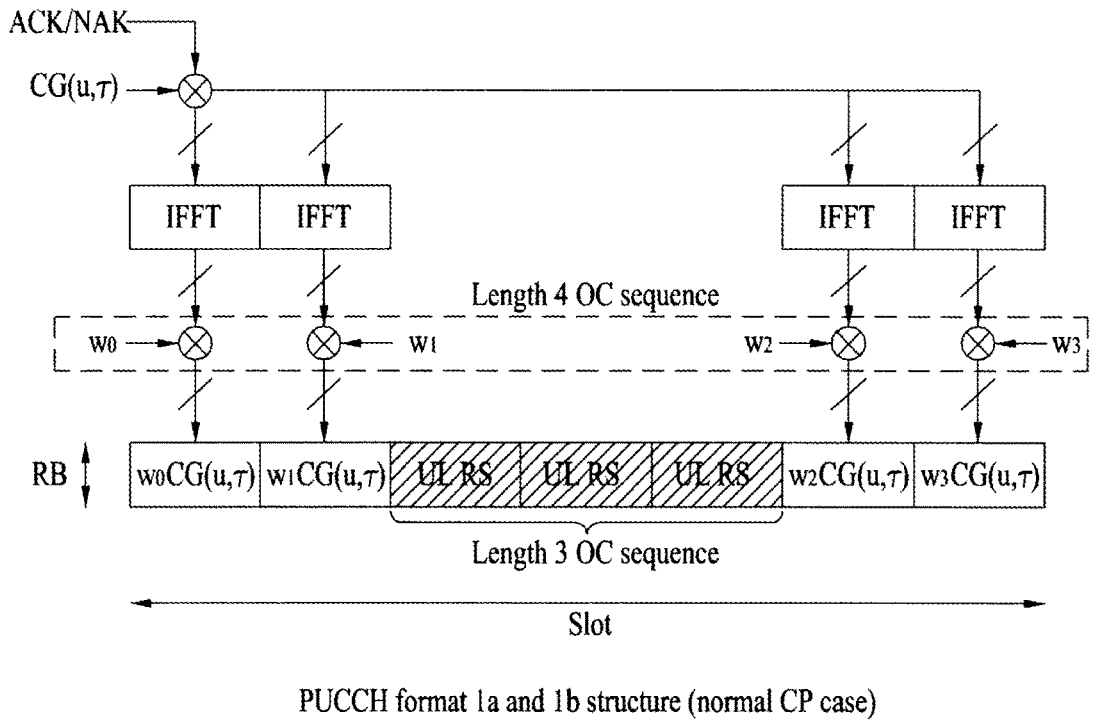
FIGS. 13 and 14 illustrate slot level structures of PUCCH formats 1a and 1b.
Figure 14:
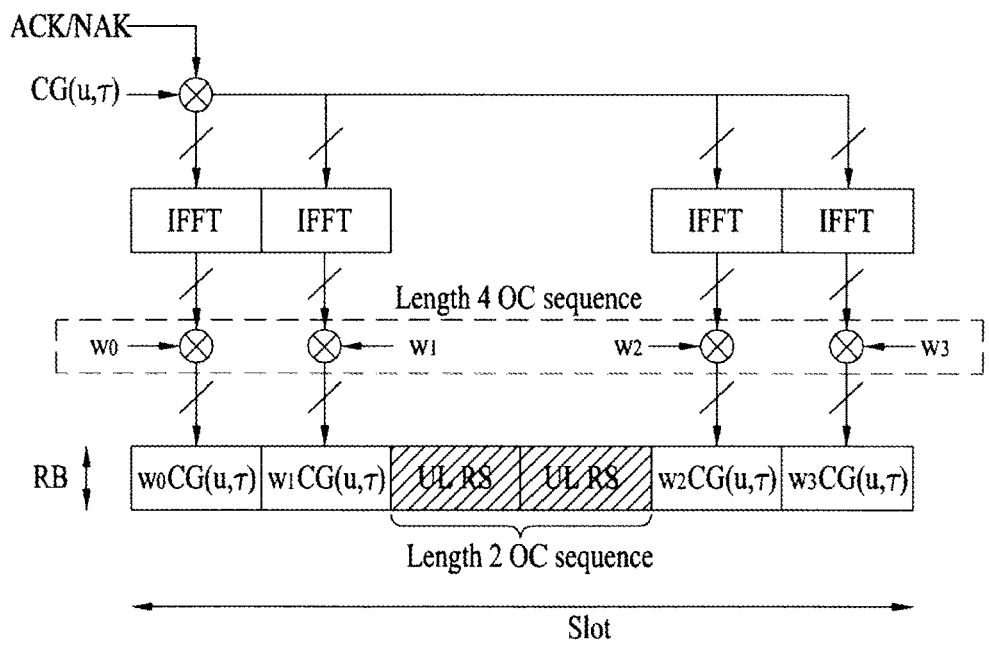

FIG. 13 illustrates PUCCH formats 1a and 1b in case of normal CP and FIG. 14 illustrates PUCCH formats 1a and 1b in case of extended CP. In PUCCH formats 1a and 1b, the same control information is repeated in a subframe on a slot-by-slot basis. ACK/NACK signals are respectively transmitted from UEs through different resources composed of different cyclic shifts (CSs) (frequency domain codes) and orthogonal cover codes (OCs or OCCs) (time domain spreading codes) of a computer-generated constant amplitude zero auto correlation (CG-CAZAC) sequence. An OC includes a Walsh/DFT orthogonal code, for example. If the number of CSs is 6 and the number of OCs is 3, a total of 18 UEs can be multiplexed in the same physical resource block (PRB) on a single antenna basis. Orthogonal sequence w0,w1,w2,w3 may be applied in an arbitrary time domain (after FFT) or in an arbitrary frequency domain (prior to FFT).

An ACK/NACK resource composed of a CS, OC and PRB may be given to a UE through radio resource control (RRC) for SR and persistent scheduling. The ACK/NACK resource may be implicitly provided to the UE by a lowest CCE index of a PUCCH corresponding to a PDSCH for dynamic ACK/NACK and non-persistent scheduling.

Figure 15:
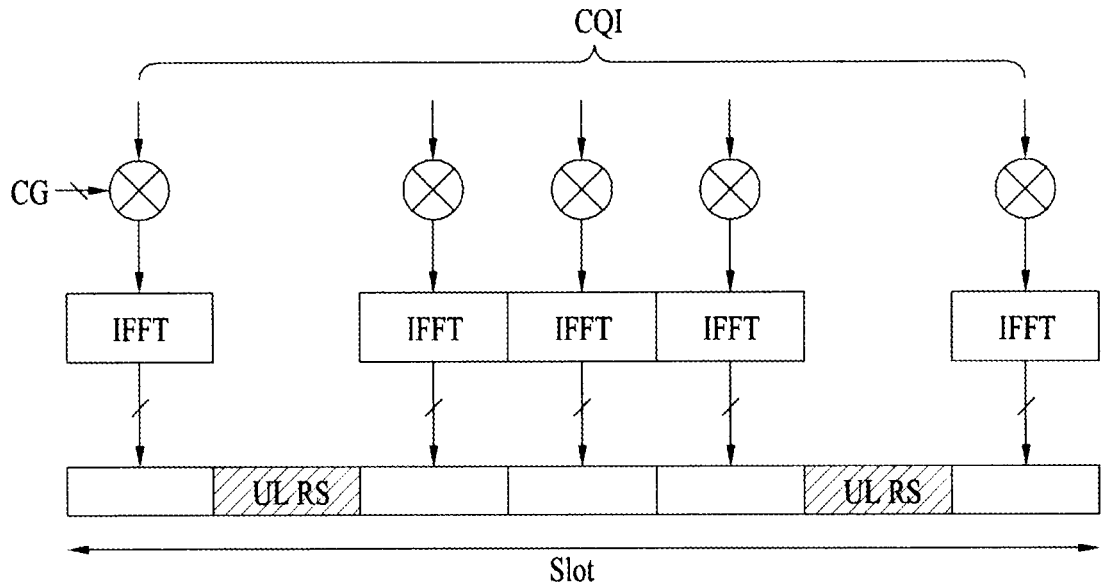
FIGS. 15 and 16 illustrate slot level structures of PUCCH formats 2/2a/2b.
Figure 16:
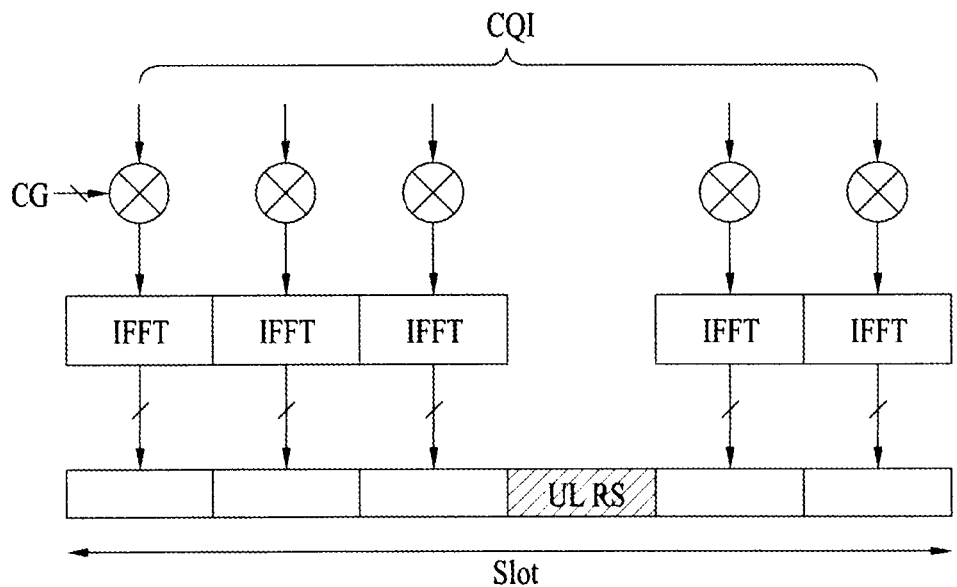

FIG. 15 illustrates PUCCH formats 2/2a/2b in case of normal CP and FIG. 16 illustrates PUCCH formats 2/2a/2b in case of extended CP. Referring to FIGS. 15 and 16, one subframe includes 10 QPSK data symbols in addition to RS symbols in case of normal CP. Each of the QPSK symbols is spread in the frequency domain according to CS and then mapped to a corresponding SC-FDMA symbol. SC-FDMA symbol level CS hopping may be applied to randomize inter-cell interference. An RS may be multiplexed according to CDM using CSs. For example, if the number of available CSs is 12 or 6, 12 or 6 UEs can be multiplexed in the same PRB. That is, a plurality of UEs can be multiplexed according to CS+OC+PRB and CS+PRB in PUCCH formats 1/1a/1b and 2/2a/2b.

Orthogonal sequences with length-4 and length-3 for PUCCH formats 1/1a/1b are shown in Table 7 and Table 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequences for an RS in PUCCH formats 1/1a/1b are shown in Table 9.

TABLE 9

| Sequence index $\bar{n}_{oc}(n_s)$ | 1a and 1b | |
|---|---|---|
| | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b. FIG. 17 corresponds to a case of $\Delta_{shift}^{PUCCH}=2$.

Figure 18:
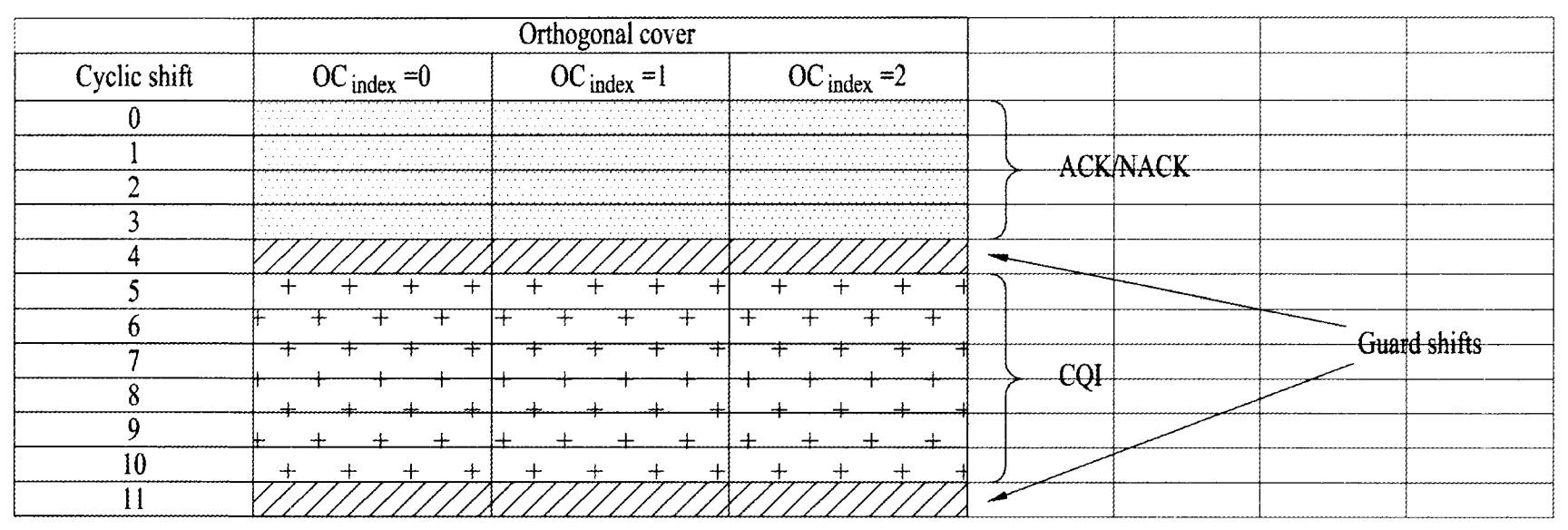

FIG. 18 illustrates channelization for a hybrid structure of PUCCH formats 1/1a/1b and 2/2a/2b in the same PRB.

CS hopping and OC remapping may be applied as follows.

(1) Symbol-based cell-specific CS hopping for randomization of inter-cell interference (2) Slot level CS/OC remapping
  1) For inter-cell interference randomization
  2) Slot-based access for mapping between ACK/NACK channels and resources (k)

Resource $n_r$ for PUCCH formats 1/1a/1b includes the following combination.

(1) CS (corresponding to a DFT orthogonal code at a symbol level) $n_{cs}$ (2) OC (orthogonal code at a slot level) $n_{oc}$ (3) Frequency resource block (RB) $n_{rb}$ When indexes indicating CS, OC and RB are $n_{cs}$, $n_{oc}$, and $n_{rb}$, respectively, a representative index $n_r$ includes $n_{cs}$, $n_{oc}$ and $n_{rb}$. Here, $n_r$ satisfies $n_r=(n_{cs}, n_{oc}, n_{rb})$.

CQI, PMI, RI and a combination of CQI and ACK/NACK may be transmitted through PUCCH formats 2/2a/2b. In this case, Reed-Muller (RM) channel coding is applicable.

For example, channel coding for a UL CQI in an LTE system is described as follows. Bit sequence $a_0, a_1, a_2, a_3, \ldots, a_{i-1}$ is channel-coded using RM code (20,A). Table 10 shows a base sequence for code (20,A). Here, $a_0$ and $a_{A-1}$ denote a most significant bit (MSB) and a least significant bit (LSB). In the case of extended CP, a maximum number of information bits is 11 in cases other than a case in which CQI and ACK/NACK are simultaneously transmitted. The UI CQI may be subjected to QPSK modulation after being coded into 20 bits using the RM code. The coded bits may be scrambled before being subjected to QPSK modulation.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated according to Equation 9.

$$b_i = \sum_{n=0}^{A-1} (a_n \cdot M_{i,n}) \bmod 2 \qquad \text{[Equation 9]}$$

Here, $i=0, 1, 2, \ldots, B-1$.

Table 11 shows an uplink control information (UCI) field for wideband report (single antenna port, transmit diversity or open loop spatial multiplexing PDSCH) CQI feedback.

TABLE 11

| Field | Band |
| --- | --- |
| Wideband CQI | 4 |

Table 12 shows a UCI field for wideband CQI and PMI feedback. This field reports closed loop spatial multiplexing PDSCH transmission.

TABLE 12

| | Band | | | |
| --- | --- | --- | --- | --- |
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI(Precoding Matrix Index) | 2 | 1 | 4 | 4 |

Table 13 shows a UCI field for RI feedback for wideband report.

TABLE 13

| | Bit widths | | |
| --- | --- | --- | --- |
| | | 4 antenna ports | |
| Field | 2 antenna ports | Maximum 2 layers | Maximum 4 layers |
| RI(Rank Indication) | 1 | 1 | 2 |

Figure 19:
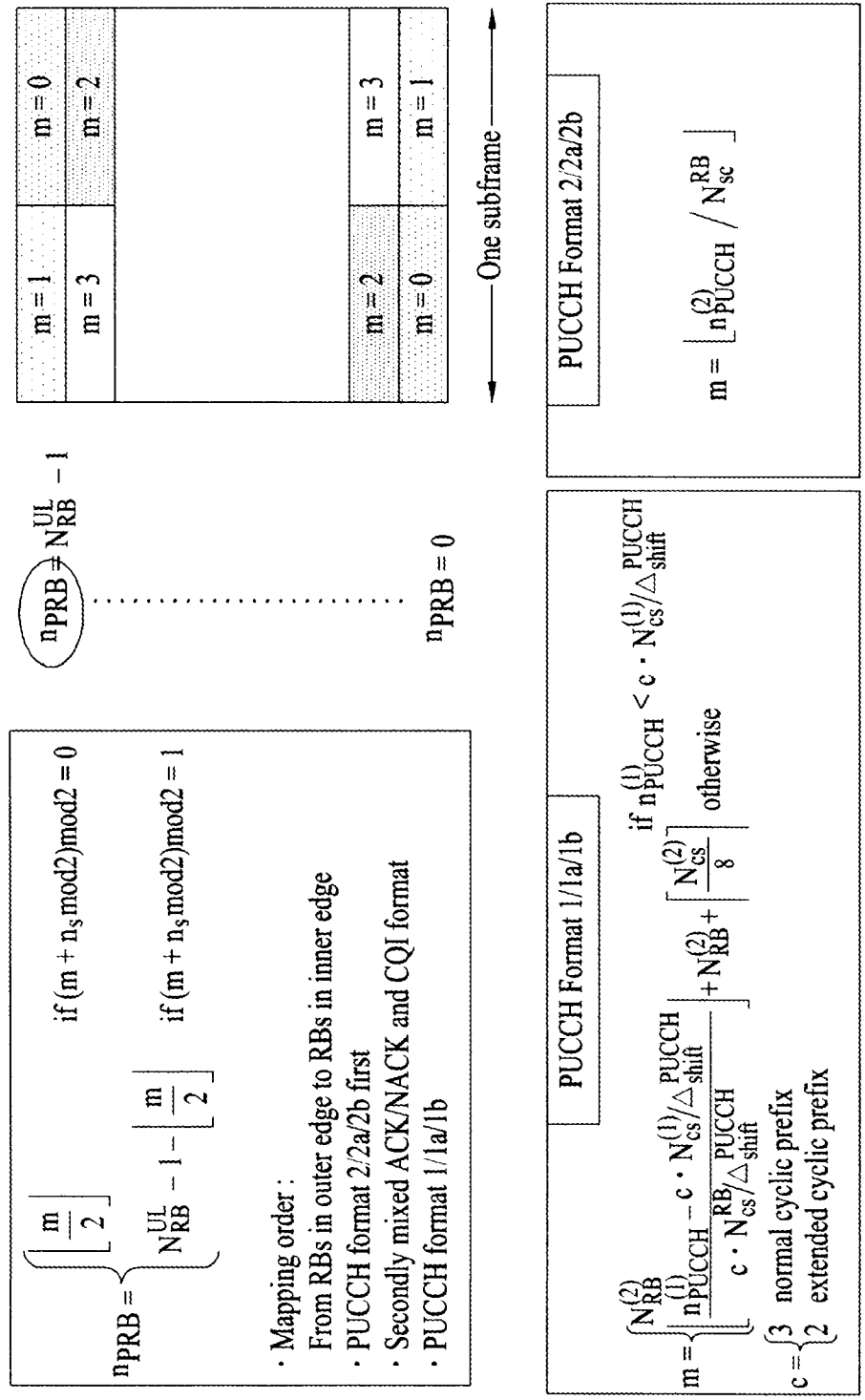
FIG. 19 illustrates PRB allocation for PUCCH transmission.

FIG. 19 illustrates PRB allocation. As shown in FIG. 19, a PRB may be used for PUCCH transmission in slot $n_s$.

A multi-carrier system or a carrier aggregation system means a system using aggregation of a plurality of carriers having a bandwidth narrower than a target bandwidth for supporting a wideband. When the plurality of carriers having a bandwidth narrower than the target bandwidth are aggregated, the bandwidth of the aggregated carriers may be limited to the bandwidths used in existing systems for backward compatibility with the existing systems. For example, an LTE system supports bandwidths of 1.4 MHz, 3 MHz, 5 MHz, 10 MHz, 15 MHz and 20 MHz and an LTE-A system evolved from the LTE system can support bandwidths wider than 20 MHz using bandwidths supported by the LTE system. Alternatively, a new bandwidth may be defined to support carrier aggregation irrespective of the bandwidths used in existing systems. The term 'multi-carrier' can be used with carrier aggregation and bandwidth aggregation. Carrier aggregation includes both contiguous carrier aggregation and non-contiguous carrier aggregation.

Figure 20:
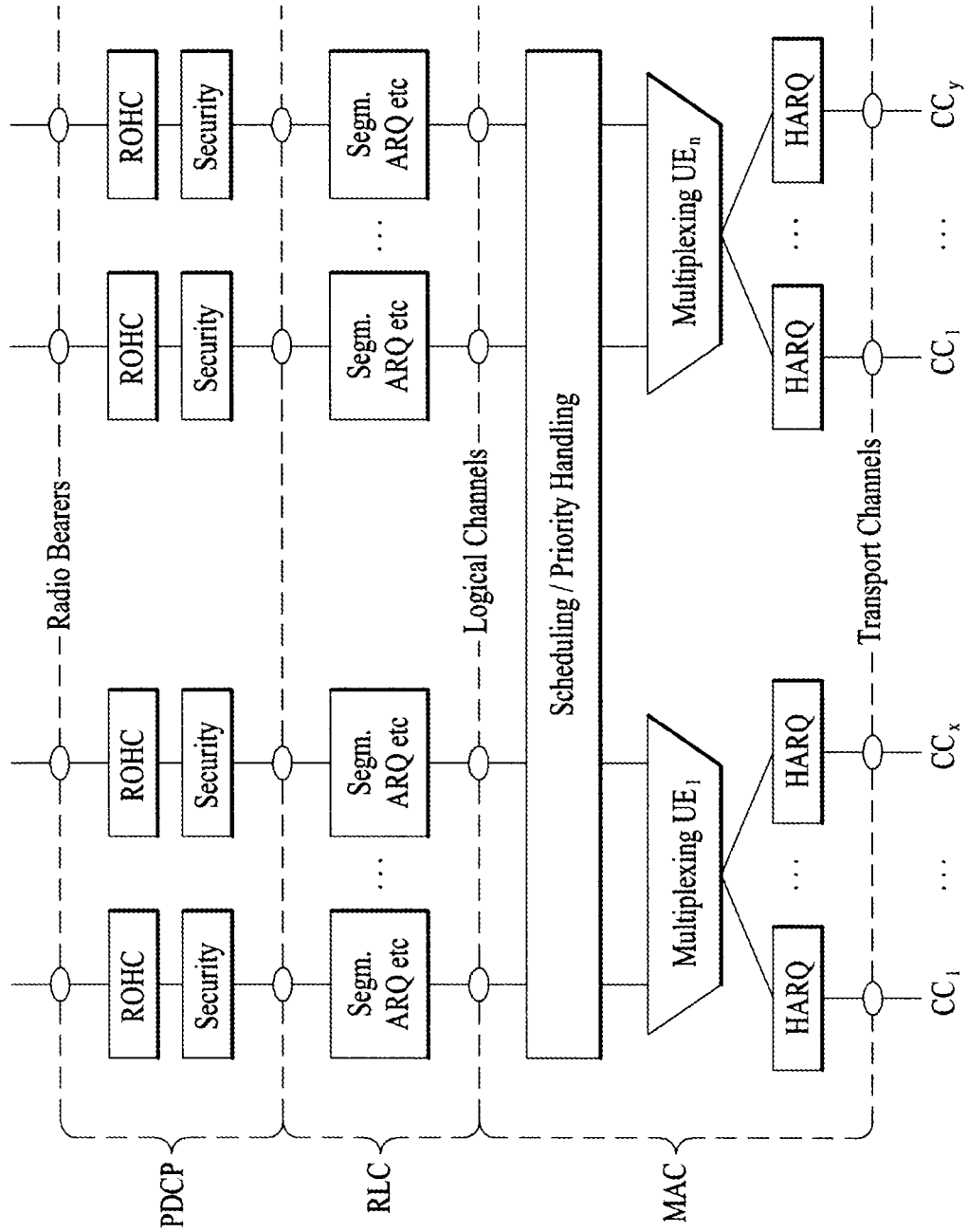
FIG. 20 illustrates a concept of management of downlink component carriers in a base station (BS)
Figure 21:
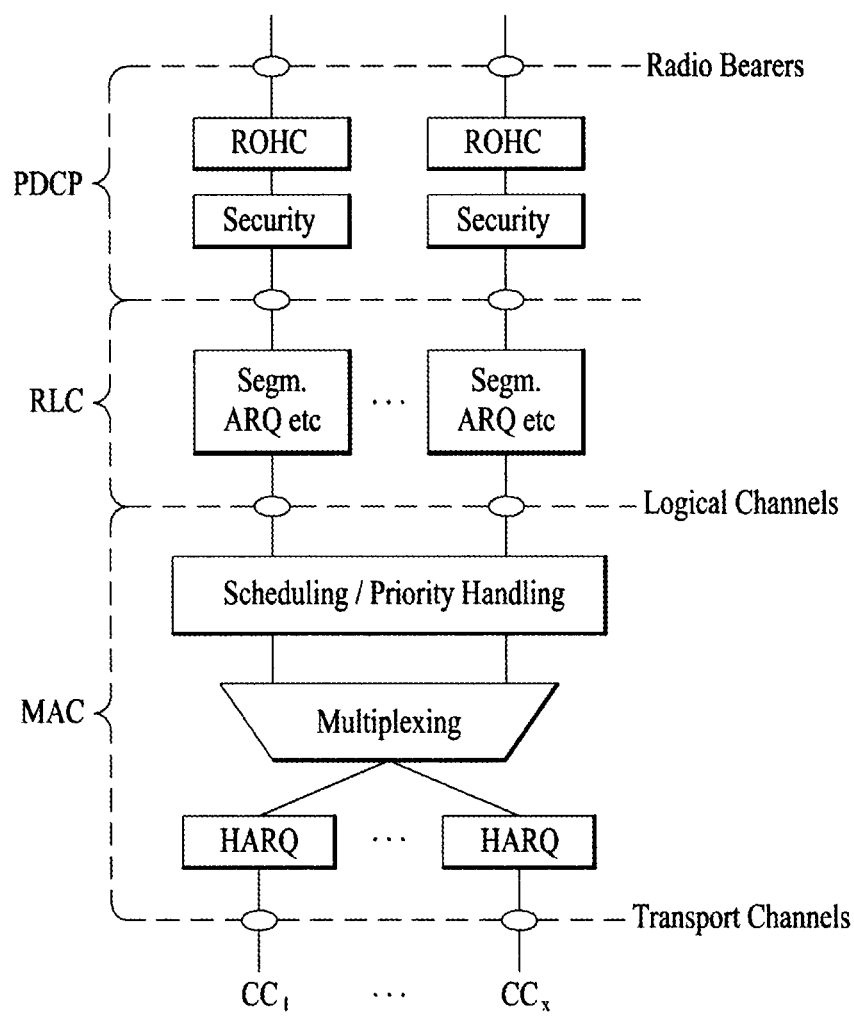
FIG. 21 illustrates a concept of management of uplink component carriers in a user equipment (UE)

FIG. 20 illustrates a concept of management of downlink component carriers in a BS and FIG. 21 illustrates a concept of management of uplink component carriers in a UE. For convenience, higher layers are simply referred to as a MAC layer in the following description.

Figure 22:
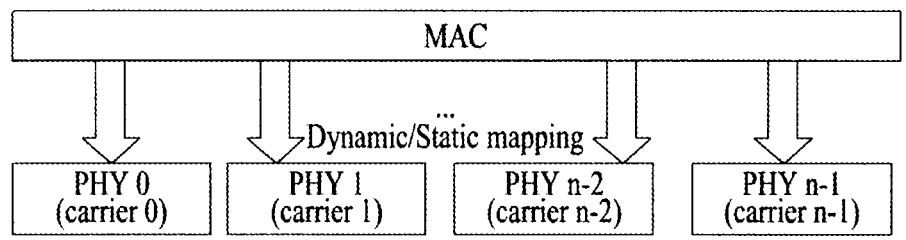
FIG. 22 illustrates a concept of management of multiple carriers by one MAC layer in a BS.
Figure 23:
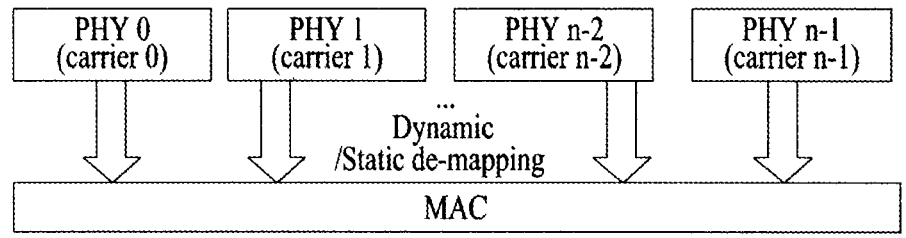
FIG. 23 illustrates a concept of management of multiple carriers by one MAC layer in a UE.

FIG. 22 illustrates a concept of management of multiple carriers by one MAC layer in a BS and FIG. 23 illustrates a concept of management of multiple carriers by MAC layer in a UE.

Referring to FIGS. 22 and 23, one MAC layer manages and operates one or more frequency carriers for transmission and reception. In this case, resource management is flexible because frequency carriers managed by one MAC layer need not be contiguous. In FIGS. 22 and 23, one PHY layer corresponds to one component carrier. Here, one PHY layer does not necessarily mean an independent radio frequency (RF) device. While one independent RF device means one PHY layer in general, one RF device is not limited thereto and may include multiple PHY layers.

Figure 24:
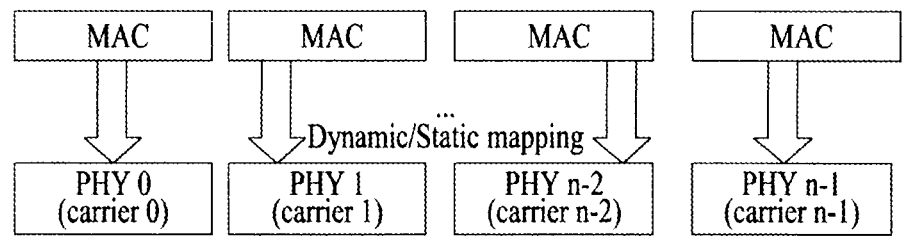
FIG. 24 illustrates a concept of management of multiple carriers by multiple MAC layers in a BS.
Figure 25:
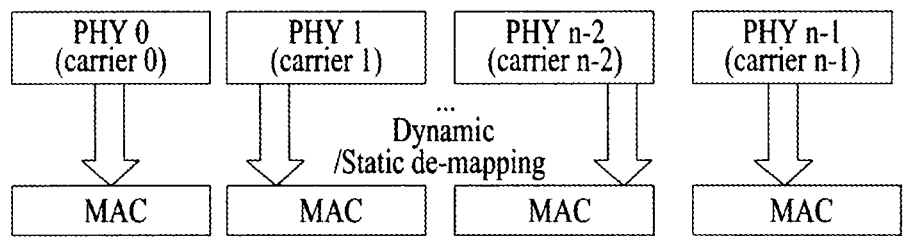
FIG. 25 illustrates a concept of management of multiple carriers by multiple MAC layers in a UE.
Figure 26:
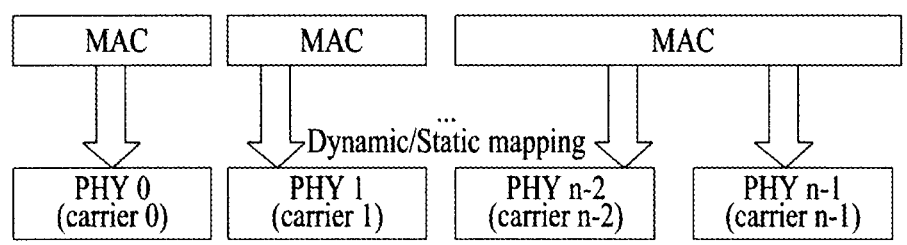
FIG. 26 illustrates a concept of management of multiple carriers by multiple MAC layers in a BS.
Figure 27:
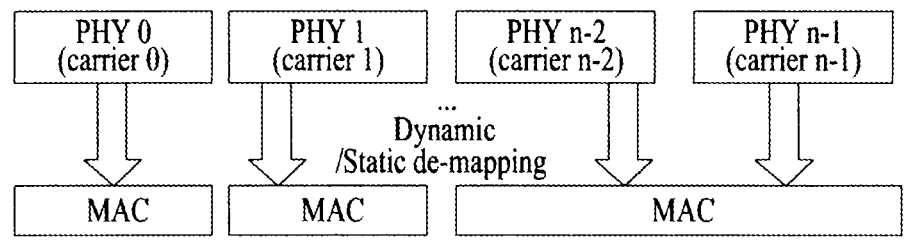
FIG. 27 illustrates a concept of management of multiple carriers by one or more MAC layers at a receiver of a UE.

FIG. 24 illustrates a concept of management of multiple carriers by multiple MAC layers in a BS and FIG. 25 illustrates a concept of management of multiple carriers by multiple MAC layers in a UE. FIG. 26 illustrates a concept of management of multiple carriers by multiple MAC layers in a BS and FIG. 27 illustrates a concept of management of multiple carriers by one or more MAC layers in a UE.

Distinguished from the structures shown in FIGS. 22 and 23, multiple carriers may be controlled by multiple MAC layers as shown in FIGS. 24 to 27.

Multiple MAC layers may control one-to-one multiple carriers as shown in FIGS. 24 and 25. Referring to FIGS. 26 and 27, MAC layers may control one-to-one some carriers and one MAC layer may control other carriers.

The above-described system includes one to N carriers which are contiguous or non-contiguous. This can be applied in uplink and downlink. A TDD system is constructed such that N carriers for downlink transmission and uplink transmission are operated and an FDD system is constructed such that multiple carriers are respectively used for uplink and downlink. The FDD system may support asymmetrical carrier aggregation in which the number of aggregated carriers and/or a carrier bandwidth in uplink is different from those in downlink.

When the number of aggregated component carriers in uplink equals that in downlink, it is possible to configure all component carriers such that they are compatible with existing systems. However, component carriers that do not consider compatibility are not excluded from the present invention.

While the following description is made on the assumption that, when a PDCCH is transmitted using downlink component carrier #0, a PDSCH corresponding to the PDCCH is transmitted through downlink component carrier #0, it is apparent that the PDSCH can be transmitted through a different downlink component carrier using cross-carrier scheduling. The term "component carrier" can be replaced with an equivalent term (e.g. cell).

Figure 28:
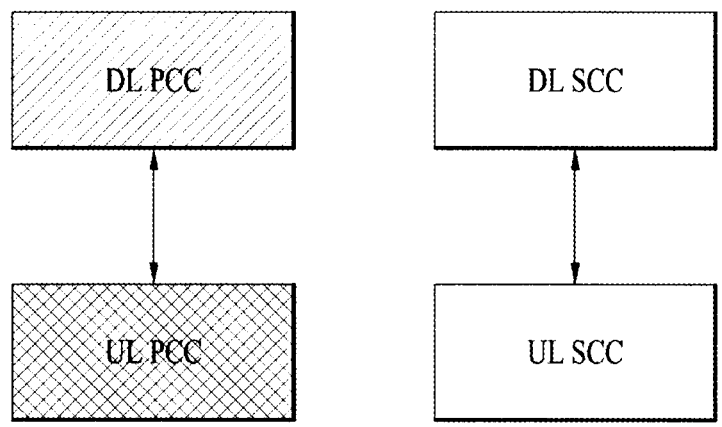
FIG. 28 illustrates a general carrier aggregation scenario.

FIG. 28 illustrates a general carrier aggregation scenario. It is assumed that 2 DL CCs and 2 UL CCs are configured for convenience of description.

Referring to FIG. 28, a UL CC includes one UL primary CC (UL PCC) and one UL secondary CC (UL SCC). The UL PCC can be defined as a UL CC carrying a PUCCH, UCI or PUCCH/UCI. While a plurality of DL PCCs may be present, it is assumed that one DL PCC is present in the present embodiment for easiness of description. Furthermore, while a plurality of DL SCCs may be present, it is assumed that one DL SCC is present in the present embodiment for easiness of description. A 2DL:2UL configuration shown in FIG. 28 is exemplary and it is apparent that other CA configurations (e.g. a configuration of three or more DL CCs (UL CCs)) can be used. DL-UL linkage can be determined from UL linkage through UL EARFCN information of SIB2.

A DL PCC can be defined as a DL CC linked with a UL PCC. Here, linkage includes both implicit linkage and explicit linkage. In LTE, one DL CC and one UL CC are uniquely paired. For example, a DL CC linked with a UL PCC can be referred to as a DL PCC, according to LTE pairing. This can be regarded as implicit linkage. Explicit linkage means that a network configures linkage in advance and may be RRC-signaled. In explicit linkage, a DL CC paired with a UL PCC can be referred to as a DL PCC. The DL PCC can be configured through higher layer signaling. Otherwise, the DL PCC may be a DL CC initially accessed by a UE. DL CCs other than the DL PCC can be referred to as DL SCCs. Similarly, UL CCs other than the UL PCC can be referred to UL SCCs.

Figure 29:
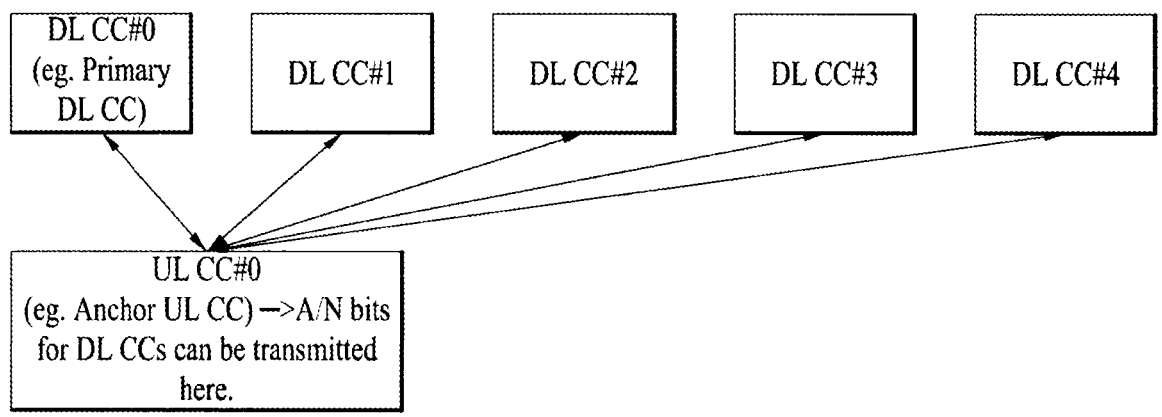
FIG. 29 illustrates a scenario of transmitting uplink control information (UCI) in a carrier aggregation system.

FIG. 29 illustrates a scenario of transmitting UCI in a wireless communication system that supports carrier aggregation. This scenario is based on the assumption that UCI is ACK/NACK (A/N). However, this is exemplary and UCI can include control information such as channel status information (e.g. CQI, PMI, RI, etc) and scheduling request information (e.g. SR).

FIG. 29 illustrates asymmetrical carrier aggregation in which 5 DL CCs are linked to one UL CC. This asymmetrical carrier aggregation may be set from the viewpoint of UCI transmission. That is, DL CC-UL CC linkage for the UCI and DL CC-UL CC linkage for data may be different from each other. When it is assumed that one DL CC can transmit a maximum of two codewords, at least two UL ACK/NACK bits are needed. In this case, at least 10 ACK/NACK bits are necessary to transmit ACK/NACK information for data, received through 5 DL CCs, using one UL CC. If DTX status is also supported for each DL CC, at least 12 bits ($=5^5=3125=11.6$ bits) are needed for ACK/NACK transmission. The conventional PUCCH formats 1a/1b can transmit ACK/NACK information having a maximum of 2 bits, and thus it cannot transmit ACK/NACK information having an increased number of bits. While it has been described that carrier aggregation increases the quantity of UCI, an increase in the number of antennas, presence of a backhaul subframe in a TDD system and a relay system, etc. may cause an increase in the quantity of UCI. Similarly to ACK/NACK information, when control information related to a plurality of DL CCs is transmitted through one UL CC, the quantity of the control information increases. For example, when CQI/PMI/RI related to a plurality of DL CCs is transmitted, a CQI payload may increase. A DL CC and a UL CC may also be respectively called a DL cell and a UL cell and an anchor DL CC and an anchor UL CC may be respectively called a DL primary cell (PCell) and a UL PCell.

DL-UL pairing may correspond to FDD only. DL-UL pairing may not be additionally defined for TDD because TDD uses the same frequency. DL-UL linkage may be determined from UL linkage through UL EARFCN information of SIB2. For example, DL-UL linkage can be obtained through SIB2 decoding in the event of initial access and acquired through RRC signaling in other cases. Accordingly, only SIB2 linkage is present and other DL-UL pairing may not be explicitly defined. For example, in a 5DL:1UL structure shown in FIG. 28, DL CC #0 and UL CC #0 is in a SIB2 linkage relationship and other DL CCs may be in the SIB2 linkage relationship with other UL CCs that are not set to the corresponding UE.

While some embodiments of the present invention are focused on asymmetrical carrier aggregation, they are exemplary and the present invention is applicable to various carrier aggregation scenarios including symmetrical carrier aggregation.

Embodiment

A scheme for efficiently transmitting an increased quantity of UCI will now be described. Specifically, a new PUCCH format/signal processing procedure/resource allocation method for transmitting UCI in increased quantity are proposed. In the following description, the PUCCH format proposed by the present invention is referred to as a new PUCCH format, LTE-A PUCCH format, CA PUCCH format or PUCCH format 3 in view of the fact that up to PUCCH format 2 has been defined in LTE. To assist in understanding of the present invention, the following description is focused on a case in which multiple ACK/NACK bits are used as control information in increased quantity. However, the control information is not limited to multiple ACK/NACK bits in the present invention. PUCCH format 3 and transmission schemes include the following. The present invention can further include PUCCH formats other than the following examples.

Reuse of PUCCH format 2: UCI (e.g. multiple ACK/NACKs) can be transmitting using PUCCH format 2 or a modified form thereof, defined in LTE.

DFT based PUCCH: Information can be transmitted by DFT precoding and application of a time domain orthogonal cover (OC) at an SC-FDMA symbol level. This will be described in detail below with reference to FIG. 30.

SF reduction: A symbol space can be doubled by reducing a time domain spreading factor from 4 to 2 in LTE PUCCH format 1a/1b. Information bits may be channel-coded or not. This will be described later in detail with reference to FIG. 31.

Channel selection: When multiple PUCCH resources are provided, information can be transmitted by combining the number of cases of selecting a specific PUCCH resource and constellation modulated to the corresponding PUCCH resource. For example, assuming that 2 PUCCH resources are present and QPSK modulation is employed, a total of 8(=2*4) states (=3 bits) can be transmitted.

MSM (Multi-sequence modulation): Information can be transmitted by modulating different pieces of information for each of multiple PUCCHs. For example, assuming that 2 PUCCH resources are present and QPSK modulation is employed, a total of 16 states (=4*4=4 bits) can be transmitted when the information is not coded.

Hybrid approach: A combination of at least two of formats including the aforementioned formats as well as other formats. For example, channel selection and SF reduction can be combined.

Figure 30:
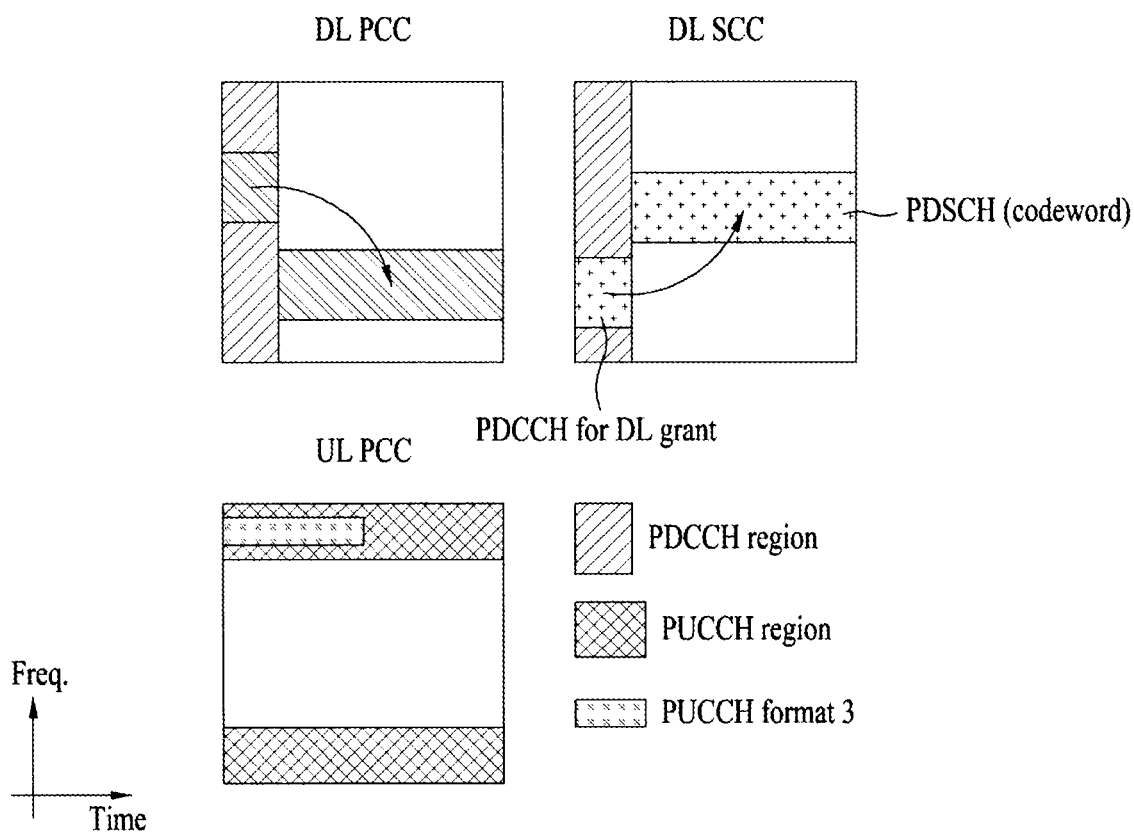
FIG. 30 illustrates signal transmission using PUCCH format 3.

FIG. 30 illustrates signal transmission using PUCCH format 3.

Referring to FIG. 30, one DL primary component carrier (DL PCC) and one DL secondary component carrier (DL SCC) are present. The DL PCC may be linked with a UL PCC. It is assumed that each of the DL PCC and the DL SCC includes one DL grant and a PDCCH is transmitted through each CC. If each DL CC transmits 2 codewords (a total of 4 codewords), it is possible to transmit, through PUCCH format 3 on the UL PCC, 4 bits when a DTX status is not reported and 5 bits when the DTX status is reported.

A description will be given of a DFT-based PUCCH format as an example of PUCCH format 3 with reference to the attached drawings.

For convenience, in the following description, the UCI/RS symbol structure of the conventional PUCCH format 1 (normal CP) of LTE is used as a subframe/slot based UCI/RS symbol structure applied to PUCCH format 3 according to an embodiment of the present invention. However, the subframe/slot based UCI/RS symbol structure is exemplary and the present invention is not limited to a specific UCI/RS symbol structure. In the PUCCH format according to the present invention, the number of UCI/RS symbols, positions of the UCI/RS symbols, etc. may be freely changed according to system design. For example, the PUCCH format according to an embodiment of the present invention can be defined using the RS symbol structures of PUCCH format 2/2a/2b of LTE.

The PUCCH format according to embodiments of the present invention can be used to transmit UCI of an arbitrary type and in an arbitrary size. For example, PUCCH format 3 can transmit information such as ACK/NACK, CQI, PMI, RS, SR, etc. This information may have a payload of an arbitrary size. For convenience, description of the following embodiments and drawings are focused on a case in which the PUCCH format according to the present invention transmits ACK/NACK information.

FIGS. 31a to 31f illustrate structures of PUCCH format 3 and signal processing procedures for the same according to an embodiment of the present invention. The present embodiment describes a DFT based PUCCH format. In the present embodiment, an RS can use the structure of LTE. For example, the RS can be obtained by applying a cyclic shift to a base sequence.

Figure 31A:
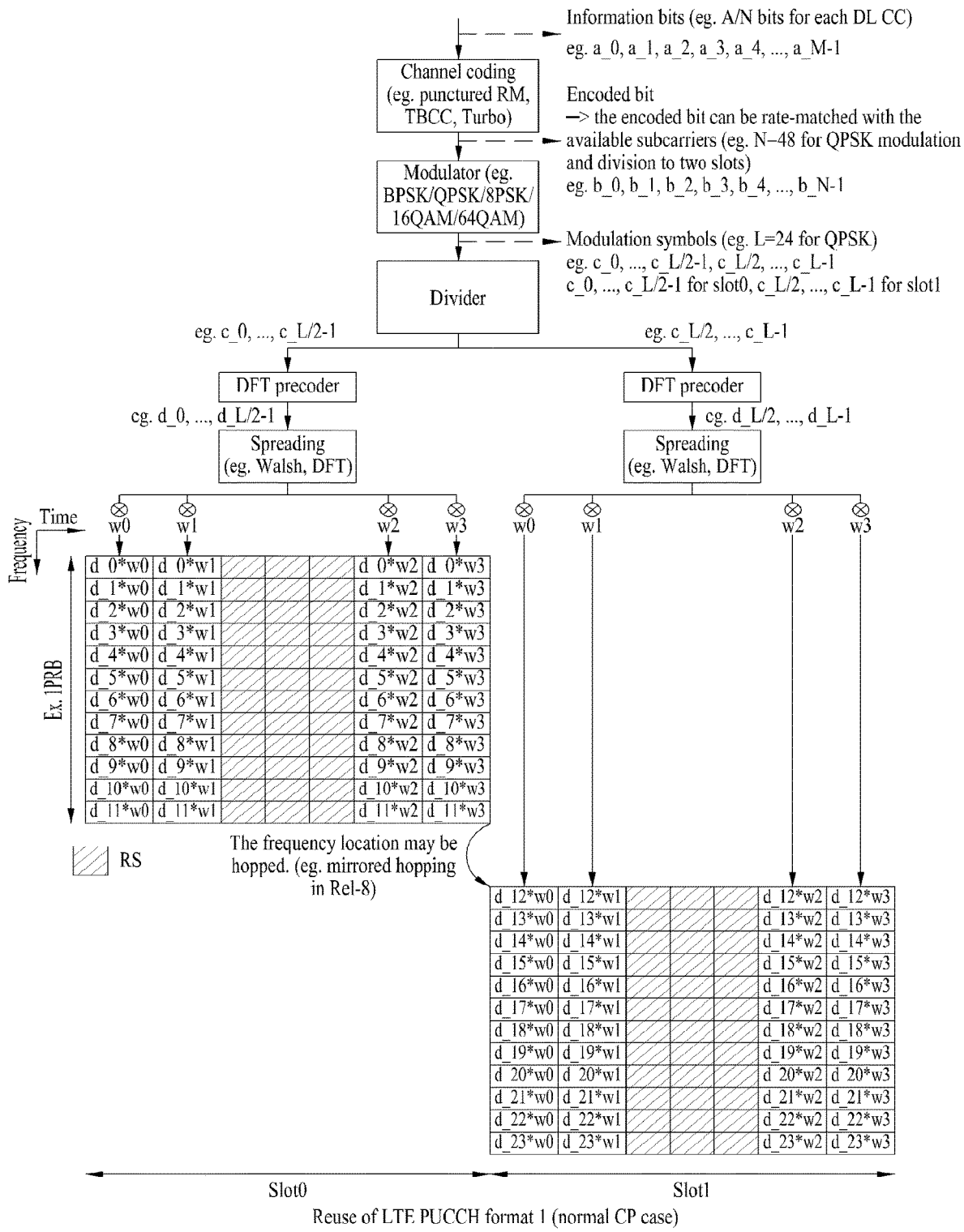
FIGS. 31$a$-31$f$ illustrate PUCCH format 3 and a signal processing procedure for the same according to an embodiment of the present invention.

FIG. 31a illustrates a case in which PUCCH format 3 according to the present invention is applied to PUCCH format 1 (normal CP). Referring to FIG. 31a, a channel coding block channel-codes information bits $a\_0, a\_1, \ldots, a\_M-1$ (e.g. multiple ACK/NACK bits) to generate encoded bits (coded bits or coding bits) (or a codeword) $b\_0, b\_1, \ldots, b\_N-1$. Here, M denotes an information bit size and N denotes an encoded bit size. The information bits include multiple ACK/NACK bits for a plurality of data (or PDSCH) received through a plurality of DL CCs, for example. The information bits $a\_0, a\_1, \ldots, a\_M-1$ are joint-coded regardless of the type/number/size of UCI that forms the information bits. For example, when the information bits include multiple ACK/NACK bits for a plurality of DL CCs, channel coding is performed for all information bits instead of each DL CC and each ACK/NACK bit to generate a single codeword. Channel coding includes simple repetition, simplex coding, RM coding, punctured RM coding, Tail-biting convolutional coding (TBCC), low-density parity-check (LDDC) or turbo-coding but is not limited thereto. The encoded bits can be rate-matched in consideration of a modulation order and resource quantity, which is not shown in the figure. The rate matching function may be included in the channel coding block or may be executed through a separate functional block.

A modulator modulates the encoded bits $b\_0, b\_1, \ldots, b\_N-1$ to generate modulation symbols $c\_0, c\_1, \ldots, c\_L-1$ where L denotes the size of the modulation symbols. A modulation method is performed by modifying the size and phase of a transport signal. For example, the modulation method includes n-PSK (Phase Shift Keying) and n-QAM (Quadrature Amplitude Modulation) (n being an integer greater than or equal to 2). Specifically, the modulation method may include BPSK (Binary PSK), QPSK (Quadrature PSK), 8-PSK, QAM, 16-QAM, 64-QAM, etc.

A divider divides the modulation symbols $c\_0, c\_1, \ldots, c\_L-1$ into slots. The order/pattern/scheme of dividing the modulation symbols into slots are not particularly limited. For example, the divider can sequentially divide the modulation symbols into the slots (localized type). In this case, modulation symbols $c\_0, c\_1, \ldots, c\_L/2-1$ can be divided into slot 0 and modulation symbols $c\_L/2, c\_L/2+1, \ldots, c\_L-1$ can be divided into slot 1, as shown in FIG. 29a. Furthermore, the modulation symbols may be interleaved (permuted) when divided into the slots. For example, even-numbered modulation symbols can be divided into slot 0 and odd-numbered modulation symbols can be divided into slot 1. The order of the modulation operation and division operation may be changed.

A DFT precoder performs DFT precoding (e.g. 12-point DFT) for the modulation symbols divided into each slot in order to generate a single carrier waveform. Referring to FIG. 29a, the modulation symbols $c\_0, c\_1, \ldots, c\_L/2-1$ divided into slot 0 can be DFT-precoded into DFT symbols $d\_0, d\_1, \ldots, d\_L/2-1$ and the modulation symbols $c\_L/2, c\_L/2+1, \ldots, c\_L-1$ divided into slot 1 can be DFT-precoded into DFT symbols $d\_L/2, d\_L/2+1, \ldots, d\_L-1$. DFT precoding can be replaced by other corresponding linear operation (e.g. Walsh precoding).

A spreading block spreads a DFT precoded signal at an SC-FDMA symbol level (time domain). SC-FDMA symbol level time domain spreading is performed using a spreading code (sequence). The spreading code includes a quasi-orthogonal code and an orthogonal code. The quasi-orthogonal code includes a pseudo noise (PN) code. However, the quasi-orthogonal code is not limited thereto. The orthogonal code includes a Walsh code and a DFT code. However, the orthogonal code is not limited thereto. In the following description, the orthogonal code is used as the spreading code for ease of description. However, the orthogonal code is exemplary and can be replaced by the quasi-orthogonal code. A maximum spreading code size (or spreading factor SF) is limited by the number of SC-FDMA symbols used for control information transmission. For example, when 4 SC-FDMA symbols are used for control information transmission in one slot, a (quasi) orthogonal code w0,w1,w2,w3 having a length of 4 can be used for each slot. The SF means a spreading degree of control information and may be related to a UE multiplexing order or an antenna multiplexing order. The SF can be changed to 1, 2, 3, 4, . . . according to system requirements and pre-defined between a BS and a UE or signaled to the UE through DCI or RRC signaling. For example, when one of SC-FDMA symbols for control information is punctured in order to transmit an SRS, a spreading code with a reduced SF (e.g. SF=3 instead of SF=4) can be applied to control information of a corresponding slot.

The signal generated through the above-mentioned procedure is mapped to subcarriers in a PRB and then subjected to IFFT to be transformed into a time domain signal. A cyclic prefix is added to the time domain signal to generate SC-FDMA symbols which are then transmitted through an RF unit.

The above-mentioned procedure will now be described in more detail on the assumption that ACK/NACK bits for 5 DL CCs are transmitted. When each DL CC can transmit 2 PDSCHs, ACK/NACK bits for the DL CC may be 12 bits when they include a DTX status. A coding block size (after rate matching) may be 48 bits on the assumption that QPSK and SF=4 time spreading are used. Encoded bits are modulated into 24 QPSK symbols and 12 QPSK symbols are divided per slot. In each slot, 12 QPSK symbols are converted to 12 DFT symbols through 12-point DFT. In each slot, 12 DFT symbols are spread and mapped to 4 SC-FDMA symbols using a spreading code with SF=4 in the time domain. Since 12 bits are transmitted through [2 bits×12 subcarriers×8 SC-FDMA symbols], the coding rate is 0.0625(=12/192). In the case of SF=4, a maximum of 4 UEs can be multiplexed per PRB.

The signal mapped to the PRB in the procedure shown in FIG. 31a may be obtained through various equivalent signal processing procedures. Signal processing procedures equivalent to the signal processing procedure of FIG. 31a will now be described with reference to FIGS. 31b to 31g.

Figure 31B:
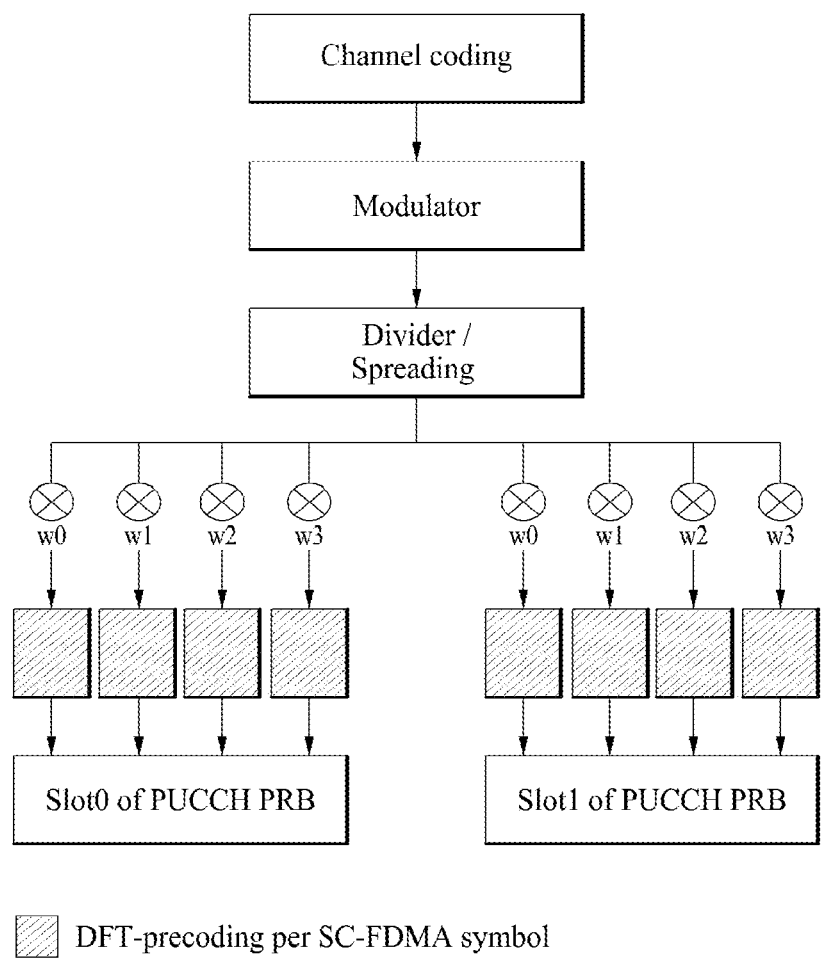

FIG. 31b shows a case in which the order of operations of the DFT precoder and the spreading block of FIG. 31a is changed. The function of the spreading block corresponds to operation of multiplying a DFT symbol sequence output from the DFT precoder by a specific constant at the SC-FMDA symbol level, and thus the same signal value is mapped to SC-FDMA symbols even though the order of operations of the DFT precoder and the spreading block is changed. Accordingly, the signal processing procedure for PUCCH format 3 can be performed in the order of channel coding, modulation, division, spreading and DFT precoding. In this case, the division and spreading may be performed by one functional block. For example, modulation symbols can be alternately divided into slots and, simultaneously, spread at the SC-FDMA symbol level. Alternatively, the modulation symbols can be copied such that they correspond to the size of a spreading code when divided into the slots, and the copied modulation symbols can be multiplied one-to-one by respective elements of the spreading code. Accordingly, a modulation symbol sequence generated for each slot is spread to a plurality of SC-FDMA symbols. Then, a complex symbol stream corresponding to the SC-FDMA symbols is DFT-precoded for each SC-FDMA symbol.

Figure 31C:
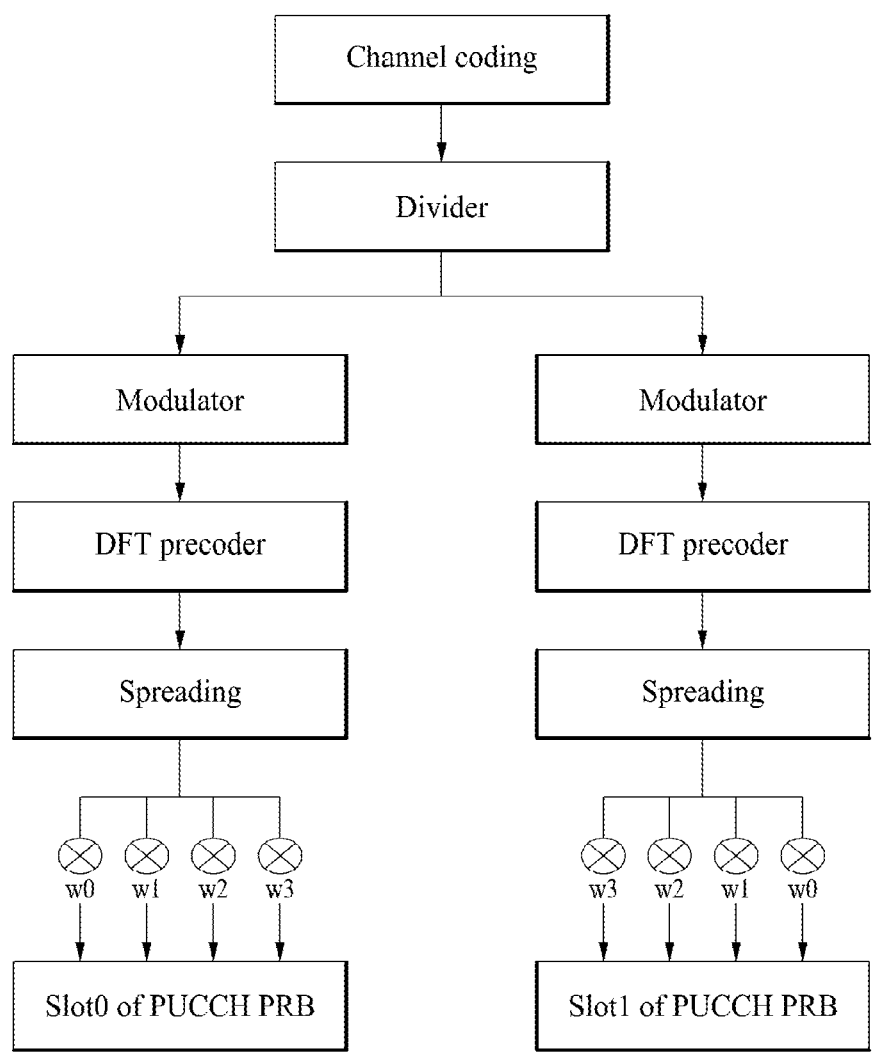

FIG. 31c shows a case in which the order of operations of the modulator and the divider of FIG. 31a is changed. In this case, in the signal processing procedure for PUCCH format 3, joint channel coding and division are performed at the subframe level, and modulation, DFT precoding and spreading are sequentially performed at the slot level.

Figure 31D:
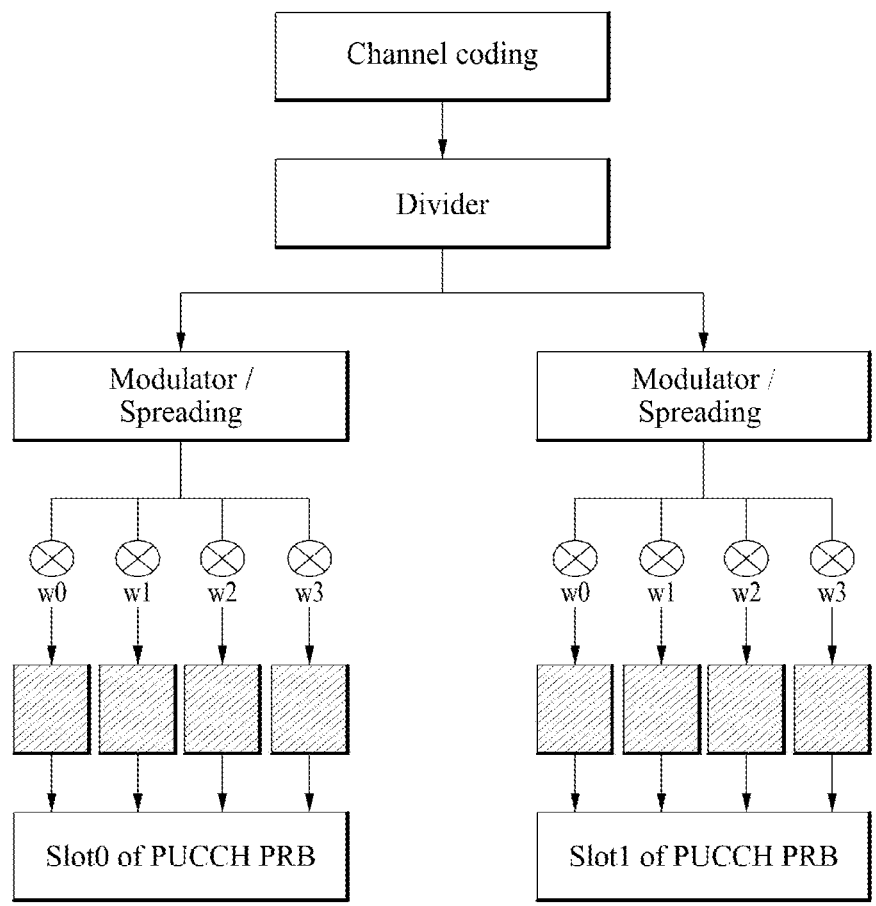

FIG. 31d shows a case in which the order of operations of the DFT precoder and the spreading block of FIG. 31c is changed. As described above, since the function of the spreading block corresponds to operation of multiplying a DFT symbol sequence output from the DFT precoder by a specific constant at the SC-FMDA symbol level, the same signal value is mapped to SC-FDMA symbols even though the order of operations of the DFT precoder and the spreading block is changed. Accordingly, in the signal processing procedure for PUCCH format 3, joint channel coding and division are performed at the subframe level, and modulation is carried out at the slot level. The modulation symbol sequence generated for each slot is spread to a plurality of SC-FDMA symbols and DFT-precoded for each SC-FDMA symbol. In this case, the modulation and spreading operations can be performed by one functional block. For example, the generated modulation symbols can be directly spread at the SC-FDMA symbol level during modulation of the encoded bits. Alternatively, during modulation of the encoded bits, the generated modulation symbols can be copied such that they correspond to the size of the spreading code and multiplied one-to-one by respective elements of the spreading code.

Figure 31E:
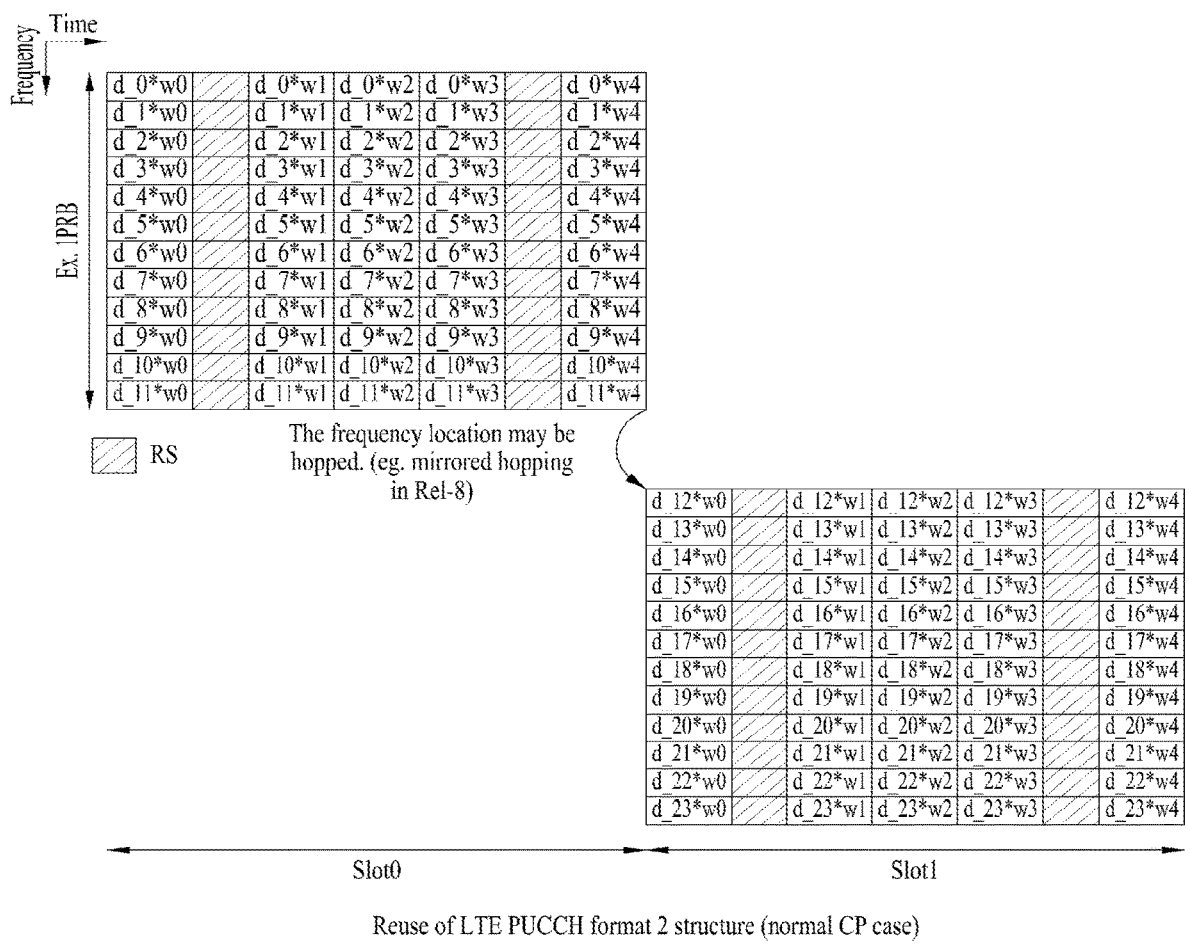
Figure 31F:
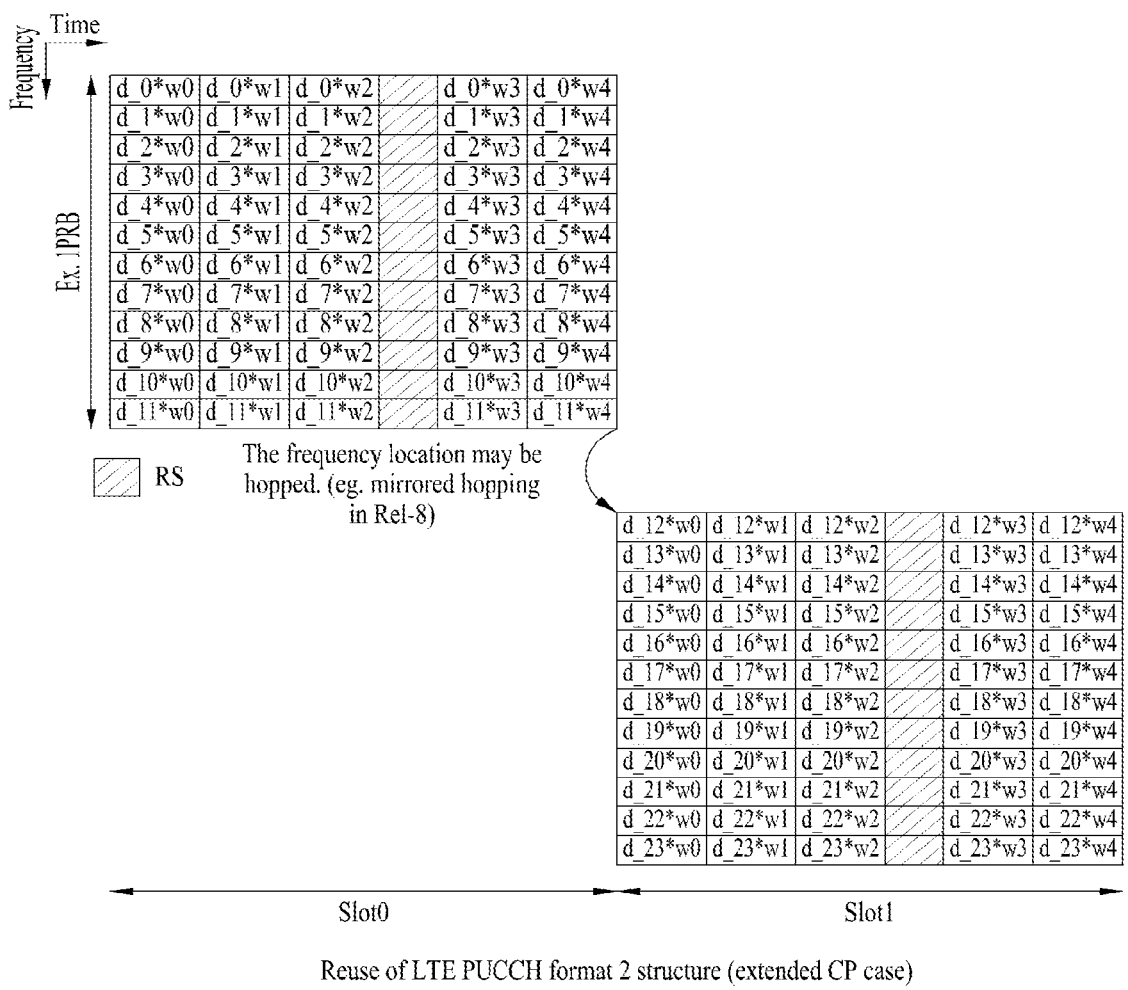

FIG. 31e shows a case in which PUCCH format 3 according to the present embodiment is applied to PUCCH format 2 (normal CP) and FIG. 30f shows a case in which PUCCH format 3 according to the present embodiment is applied to PUCCH format 2 (extended CP). While a basic signal processing procedure is the same as the procedures described with reference to FIGS. 31a to 31d, the numbers/positions of UCI SC-FDMA symbols and RS SC-FDMA symbols are different from those of FIG. 31a since PUCCH format 2 of LTE is reused.

Table 14 shows RS SC-FDMA symbol position in PUCCH format 3. It is assumed that the number of SC-FDMA symbols in a slot is 7 (indexes: 0 to 6) in case of normal CP and 6 (indexes: 0 to 5) in case of extended CP.

TABLE 14

| | RS SC-FDMA symbol position | | |
|---|---|---|---|
| | Normal CP | Extended CP | Note |
| PUCCH format 3 | 2, 3, 4 1, 5 | 2, 3 3 | Reuse PUCCH format 1 Reuse PUCCH format 2 |

Tables 15 and 16 show exemplary spreading codes according to SF value. Table 15 shows DFT codes with SF=5 and SF=3 and Table 16 shows Walsh codes with SF=4 and SF=2. A DFT code is an orthogonal code represented by $\overline{w}_m = [w_0\ w_1\ \ldots\ w_{k-1}]$, where $w_k = \exp(j2\pi km/SF)$ where k denotes a DFT code size or SF value and m is 0, 1, ..., SF−1. Tables 15 and 16 show a case in which m is used as an index for an orthogonal code.

TABLE 15

| | Orthogonal code $\overline{w}_m = [w_0\ w_1\ \ldots\ w_{k-1}]$ | |
|---|---|---|
| Index m | SF = 5 | SF = 3 |
| 0 | [1 1 1 1 1] | [1 1 1] |
| 1 | [1 $e^{j2\pi/5}$ $e^{j4\pi/5}$ $e^{j6\pi/5}$ $e^{j8\pi/5}$] | [1 $e^{j2\pi/3}$ $e^{j4\pi/3}$] |
| 2 | [1 $e^{j4\pi/5}$ $e^{j8\pi/5}$ $e^{j2\pi/5}$ $e^{j6\pi/5}$] | [1 $e^{j4\pi/3}$ $e^{j2\pi/3}$] |
| 3 | [1 $e^{j6\pi/5}$ $e^{j2\pi/5}$ $e^{j8\pi/5}$ $e^{j4\pi/5}$] | |
| 4 | [1 $e^{j8\pi/5}$ $e^{j6\pi/5}$ $e^{j4\pi/5}$ $e^{j2\pi/5}$] | |

TABLE 16

| | Orthogonal code | |
|---|---|---|
| Index m | SF = 4 | SF = 2 |
| 0 | [+1 +1 +1 +1] | [+1 +1] |
| 1 | [+1 −1 +1 −1] | [+1 −1] |
| 2 | [+1 +1 −1 −1] | |
| 3 | [+1 −1 −1 +1] | |

Code index m may be designated in advance or signaled from the BS. For example, the code index m can be implicitly linked with a CCE index (e.g. the lowest CCE index) constituting a PDCCH. The code index m may be explicitly designated through a PDCCH or RRC signaling. Furthermore, the code index m may be derived from a value designated through the PDCCH or RRC signaling. The code index m may be independently given for each subframe, each slot, and multiple SC-FDMA symbols. Preferably, the code index m can be changed for each subframe, each slot and multiple SC-FDMA symbols. That is, the code index m can be hopped at a predetermined interval.

Cell-specific scrambling using a scrambling code (e.g. a PN code such as a Gold code) corresponding to a physical cell ID (PCI) or UE-specific scrambling using a scrambling code corresponding to a UE ID (e.g. RNTI) can be additionally applied for inter-cell interference randomization, which is not shown in the figure. Scrambling may be performed for the entire information, performed in SC-FDMA symbols, carried out between SC-FDMA symbols, or carried out for both the entire information and SC-FDMA symbols. Scrambling the entire information can be achieved by performing scrambling on the information bits, encoded bits and modulation symbols prior to division. Intra-SC-FMDA symbol scrambling may be implemented by performing scrambling on the modulation symbols or DFT symbols after division. Inter-SC-FDMA symbol scrambling may be achieved by carrying out scrambling on the SC-FDMA symbols in the time domain after spreading.

UE multiplexing can be achieved by applying CDM to a signal before being subjected to the DFT precoder. For example, the signal before being subjected to the DFT precoder is a time domain signal, and thus CDM can be implemented through circular shift (or cyclic shift) or Walsh (or DFT) spreading. CDM can be performed for one of the information bits, encoded bits and modulation symbols. Specifically, a case of multiplexing 2 UEs to one SC-FDMA symbol using a Walsh code with SF=2 is exemplified. When QPSK is performed on 12 encoded bits, a complex signal of $a_0\ a_1\ a_2\ a_3\ a_4\ a_5$ is generated. Control information of each UE is spread using Walsh code [+1 +1] [+1 −1] as follows.

UE #0: [+1 +1] is applied. $a_0\ a_1\ a_2\ a_3\ a_4\ a_5\ a_0\ a_1\ a_2\ a_3\ a_4\ a_5$ are transmitted.

UE #1: [+1 −1] is applied. $a_0\ a_1\ a_2\ a_3\ a_4\ a_5\ -a_0\ -a_1\ -a_2\ -a_3\ -a_4\ -a_5$ are transmitted.

In this case, interleaving may be additionally performed. The interleaving may be applied before or after spreading. Both the spreading and interleaving are applied as follows.

UE #0: [+1 +1] is applied. $a_0\ a_0\ a_1\ a_1\ a_2\ a_2\ a_3\ a_3\ a_4\ a_4\ a_5\ a_5$ are transmitted.

UE #1: [+1 −1] is applied. $a_0, -a_0, a_1, -a_1, a_2, -a_2, a_3, -a_3, a_4, -a_4, a_5, -a_5$ are transmitted.

A signal generated from spreading and/or interleaving in a stage prior to the DFT precoder is subjected to DFT precoding (and additionally subjected to SC-FDMA symbol level time spreading as necessary) and mapped to subcarriers of the corresponding SC-FDMA symbols.

Figure 32:
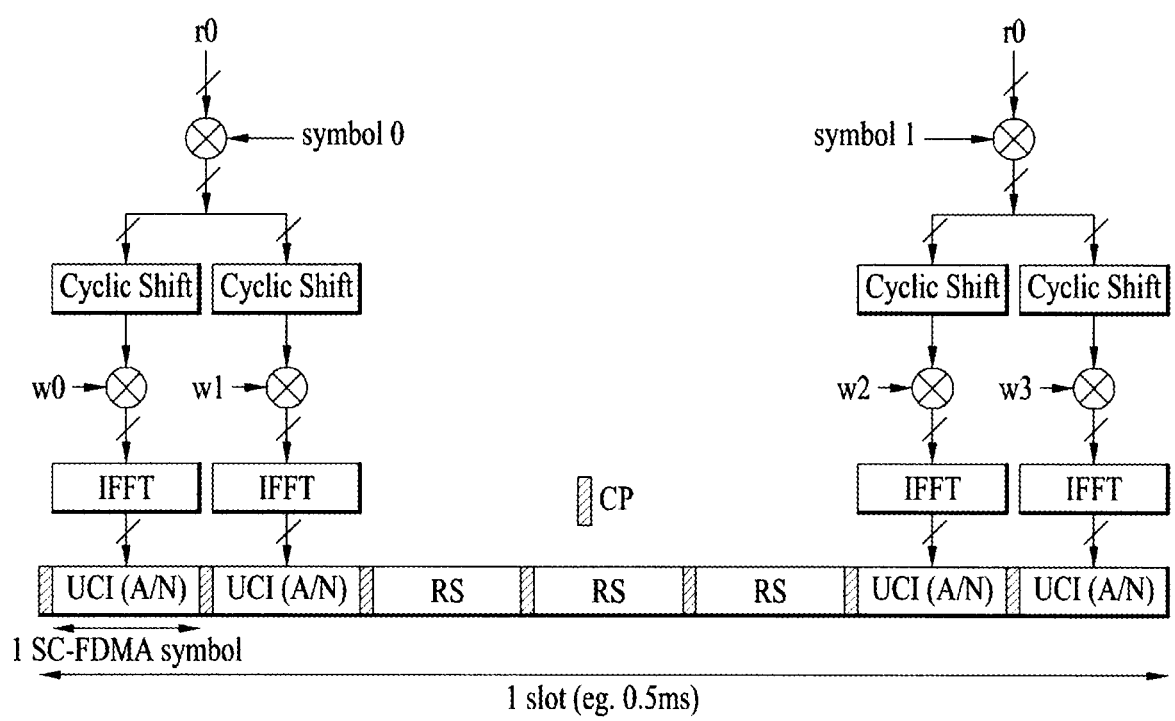
FIG. 32 illustrates PUCCH format 3 and a signal processing procedure for the same according to another embodiment of the present invention.

FIG. 32 illustrates another structure of PUCCH format 3 according to an embodiment of the present invention. This structure shows a PUCCH format to which SF reduction is applied. In this structure, an RS uses the conventional RS structure of LTE. For example, the RS can be obtained by applying a cyclic shift to a base sequence.

Referring to FIG. 32, information bits (e.g. ACK/NACK) are converted into modulation symbols (symbols 0 and 1) through modulation (e.g. QPSK, 8PSK, 16QAM, 64QAM or the like). The modulation symbols are multiplied by a base sequence r0, and a cyclic shift and an orthogonal code (OC) ([w0 w1];[w2 w3]) with SF=2 are sequentially applied to the modulation symbols. Then, the modulation symbols to which the cyclic shift and OC have been applied are subjected to IFFT and then are mapped to SC-FDMA symbols. Here, r0 includes a base sequence having a length of 12. The OC includes a Walsh cover or a DFT code defined in LTE. Orthogonal codes [w0 w1] and [w2 w3] may be independently provided or may have the same value according to implementation scheme.

LTE PUCCH format 1a/1b can transmit only one modulation symbol in one slot because it uses SF=4. Furthermore, since the same information is repeated on a slot basis, LTE PUCCH format 1a/1b can transmit only one modulation symbol at a subframe level. Accordingly, LTE PUCCH formats can transmit ACK/NACK information having a maximum of 2 bits in case of QPSK. However, the PUCCH format illustrated in FIG. 31 can transmit two modulation symbols per slot due to SF reduction. Furthermore, if slots are configured such that they transmit different pieces of information, a maximum of 4 modulation symbols can be transmitted at the subframe level. Therefore, the illustrated PUCCH format can transmit UCI (e.g. ACK/NACK) having a maximum of 8 bits in case of QPSK.

Embodiment 1: Resource Allocation for PUCCH Format 3

A resource for PUCCH format 3 may be explicitly allocated to a UE. For convenience, the resource for PUCCH format 3 is referred to as a PUCCH resource in the following description unless otherwise especially stated. For example, when the structure shown in FIG. 3 is used as PUCCH format 3, the PUCCH resource includes a code index for spreading and a PRB index. In addition, when the structure shown in FIG. 3 is used as PUCCH format 3, the PUCCH resource includes a cyclic shift value, an orthogonal code index and a PRB index. The cyclic shift value, code index and PRB index may be individually provided or inferred from one logical representative value. For example, in case of LTE, the resource for PUCCH format 1 is inferred from a logical representative value $n_{PUCCH}^{(1)}$. Similarly, the resource for PUCCH format 3 may be inferred from a logical representative value $n_{PUCCH}^{(3)}$.

As an example of explicit resource allocation, the PUCCH resource may be allocated through higher layer signaling (e.g. RRC signaling) and may be shared by multiple UEs. If the PUCCH resource is exclusively allocated to all UEs, overhead may be remarkably increased, although resource collision is not generated. Resource sharing by multiple UEs enables efficient resource management. For example, assuming that UE #0 and UE #1 share PUCCH resource #A, when a DL packet for UE #0 and a DL packet for UE #1 are respectively transmitted on different subframes, the corresponding ACK/NACK feedbacks (in subframe n+4) do no collide and thus the shared PUCCH resource #A can be efficiently used. However, if UE #0 and UE #1 are simultaneously scheduled in subframe #n, resource collision occurs because the two UEs transmit ACK/NACK using PUCCH resource #A.

To solve this problem, the present invention proposes a scheme of transmitting resource indication information (e.g. an offset, an index) for a PUCCH through a PDCCH (e.g. DL grant PDCCH). According to this scheme, it is possible to avoid resource collision by indicating the PUCCH resource using the resource indication information.

Figure 33:
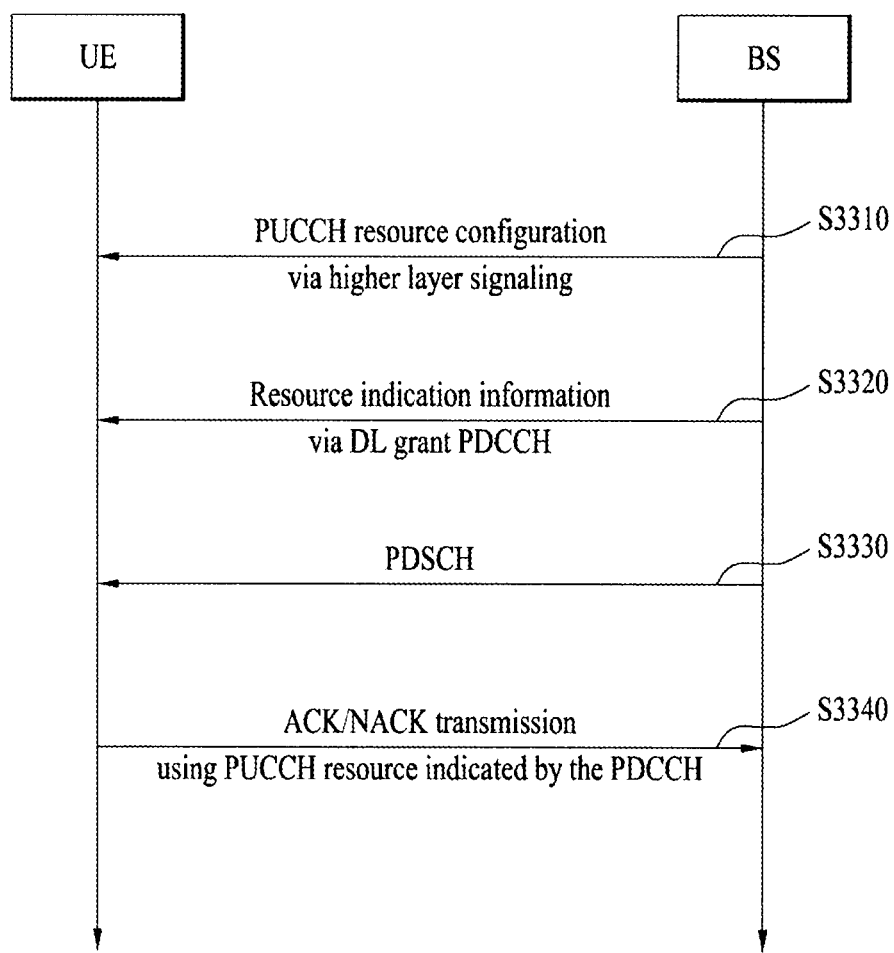
FIG. 33 illustrates a PUCCH transmission method according to an embodiment of the present invention.

FIG. 33 illustrates a PUCCH transmission method according to an embodiment of the present invention.

Referring to FIG. 33, a BS transmits PUCCH resource configuration information to a UE through higher layer signaling (e.g. RRC signaling) (S3310). The PUCCH resource configuration information indicates one or more PUCCH resources to the UE, and the one or more PUCCH resources indicated by the PUCCH resource configuration information are occupied for the UE. Then, the BS transmits a PDCCH for downlink scheduling to the UE (S3320). In the present embodiment, the PDCCH includes resource indication information (e.g. offset, index) relating to the PUCCH resource. The resource indication information may be transmitted using a field additionally defined in DCI or reusing a previously defined field. Furthermore, considering a case in which the UE misses the PDCCH, a plurality of PDCCHs may have the same resource indication information. For example, offset values transmitted over all PDCCHs can have the same value on all DL CCs. Then, the BS transmits a PDSCH indicated by the PDCCH to the UE (S3330). Upon receipt of the PDSCH, the UE transmits an ACK/NACK signal for the PDSCH to the BS through a PUCCH resource (S3340). Here, the PUCCH resource used to transmit the ACK/NACK signal is obtained using the PUCCH resource configuration information of step S3310 and the resource indication information of step S3320.

The above-mentioned PUCCH transmission method is described in more detail. For convenience of description, it is assumed that UE #0 and UE #1 share PUCCH resource #A and a BS schedules UE #0 and UE #1 in subframe #n as follows.

UE #0: Transmits PDCCH #0 on DL CC #0, transmits PDCCH #1 on DL CC #1 and transmits offset=0 in each PDCCH.

UE #1: Transmits PDCCH #0 on DL CC #0, transmits PDCCH #1 on DL CC #1 and transmits offset=2 in each PDCCH.

In this case, UE #0 transmits ACK/NACK using PUCCH resource #(A+0) and UE #1 transmits ACK/NACK using PUCCH resource #(A+2).

To allow UE #1 to use PUCCH resource #(A+2), it is necessary to pre-assign at least both PUCCH resource #A and PUCCH resource #(A+2) to UE #1. That is, it is possible to efficiently prevent PUCCH resource collision by pre-allocating a plurality of PUCCH resources (or a PUCCH resource set) to each UE (group) and indicating a PUCCH resource to be used for actual transmission using the resource indication information according to circumstance. The PUCCH resource set may be UE-specifically or UE group-specifically provided.

In this case, the BS can previously assign a plurality of PUCCH resources, which can be used by a UE, to the UE through higher layer signaling and designate a PUCCH resource to be used by the UE in a corresponding instance (e.g. subframe) through a DL grant. For example, when the BS explicitly configures (e.g. RRC signaling) PUCCH resources #0, #1, #2 and #3 for UE #0 and indicates PUCCH #2 through a DL grant for a DL SCC, UE #0 feeds back ACK/NACK through PUCCH resource #2. PUCCH resources #0, #1, #2 and #3 may be contiguously or non-contiguously configured in a PUCCH resource domain.

An offset value for indicating a PUCCH resource may be an absolute offset value or a relative offset value. When the resource indication information is a relative offset value, the offset value may correspond to the order of a plurality of PUCCH resources configured by a higher layer.

A description will be given of a scheme of transmitting the resource indication information using a conventional DCI field. A 2-bit transmit power control (TPC) field for UL PUCCH power control is defined in DL grant (DCI formats 1, 1A, 1B, 1D, 2, 2A and 2B) of LTE. When carrier aggregation is supported, a UE can perform UL PUCCH power control using only a TPC field value transmitted on one DL CC (e.g. DL PCC) because a PUCCH is transmitted on one UL PCC only. Accordingly, a TPC field value transmitted on a DL SCC can be used to transmit the resource indication information (e.g. offset, index) for indicating a PUCCH resource. Preferably, resource indication information transmitted on DL SCCs can be identical in consideration of a PDCCH missing case. That is, TPC fields transmitted on DL SCCs can be set to the same value.

More specifically, it is assumed that UE #0 and UE #1 share PUCCH resource #A and a BS schedules UE #0 and UE #1 in subframe #n as follows.

UE #0: PDCCH #0 is transmitted on DL CC #0, a TPC value in PDCCH #0 DCI is used for UL PCC PUCCH power control, PDCCH #S0 is transmitted on DL SCC #0, PDCCH #S1 is transmitted on DL SCC #S1, and TPC values in PDCCH #S0 and PDCCH #S1 DCI indicate 0.

UE #1: PDCCH #0 is transmitted on DL CC #0, the TPC value in PDCCH #0 DCI is used for UL PCC PUCCH power control, PDCCH #S0 is transmitted on DL SCC #0, PDCCH #S1 is transmitted on DL SCC #S1, and TPC values in PDCCH #S0 and PDCCH #S1 DCI indicate 2.

In this case, UE #0 transmits ACK/NACK using PUCCH resource #(A+0) and UE #1 transmits ACK/NACK using PUCCH resource #(A+2). In the present embodiment, even when UE #0 or UE #1 misses one of the DL SCCs, it is possible to correctly infer a PUCCH resource using a PDCCH of another DL SCC.

In case of a 2-bit TPC field, TPC field values of a DL SCC PDCCH can represent four states. The states can be one-to-one linked to a plurality of (e.g. 4) PUCCH resources. For example, TPC field values 0 to 3 of the DL SCC PDCCH can be used as offset values (or index values, sequence values) that indicate PUCCH resources. An offset value for indicating a PUCCH resource can be an absolute offset value or a relative offset value. When the TPC field indicates a relative offset value, the TPC values 0 to 3 can respectively indicate first to fourth PUCCH resources. For example, when PUCCH resources #0, #1, #2 and #3 are explicitly set (e.g. RRC signaled) and a TPC field value of a DL grand for a DL SCC indicates PUCCH resource #2, UE #0 can feed back ACK/NACK using PUCCH resource #2. PUCCH resources #0, #1, #2 and #3 may be contiguously or non-contiguously configured in the PUCCH resource domain.

Table 17 shows the mapping relationship between TPC field values and PUCCH resources when the PUCCH resources are indicated using a 2-bit TPC field of a DL SCC.

TABLE 17

| TPC value | PUCCH resource (e.g., $n_{PUCCH}^{(3)}$) |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

The method for solving resource collision by explicitly allocating (e.g. RRC signaling) to a UE a PUCCH resource that can be shared between UEs has been described.

This method can be equally applied to a method of implicitly linking a PUCCH resource to a CCE index of PDCCH. For example, a resource index $n_{PUCCH}^{(3)}$ for PUCCH format 3 can be obtained according to Equation 10.

$$n_{PUCCH}^{(3)} = n_{CCE} + N_{PUCCH}^{(1)} + N_{PUCCH}^{(3)} + RI \quad \text{[Equation 10]}$$

Here, $n_{CCE}$ denotes a specific CCE index (e.g. the lowest CCE index) used for PDCCH transmission. $N_{PUCCH}^{(3)}$ is a value signaled by a higher layer and relates to PUCCH format 1. And $N_{PUCCH}^{(3)}$ is a value signaled by a higher layer and may be an offset for indicating a new resource region for PUCCH format 3. $N_{PUCCH}^{(1)}$ and $N_{PUCCH}^{(3)}$ may be signaled as one value. RI denotes a value indicated by the resource indication information, for example, an offset value.

Alternatively, a specific state of the resource indication information may be used as an indicator for PUSCH piggyback. For example, when the resource indication information is transmitted using a 2-bit TPC field, [0 0], [0 1] and [1 0] can be used as resource indication information (e.g. offset values) for PUCCHs and [1 1] can be used as a PUSCH piggyback indicator. The PUSCH piggyback indicator can be used to dynamically perform UCI piggyback in a UE permitted to transmit PUCCH+PUSCH. However, usage of the PUSCH piggyback indicator is not limited thereto.

Embodiment 2: Resource Allocation for LTE Based PUCCH Format

In carrier aggregation, an LTE UE has occupied a PUCCH resource using an LTE PUCCH format and rule (e.g. CCE based resource allocation). Accordingly, it is possible to transmit a PUCCH on a UL PCC using the LTE PUCCH format and rule when the number of allocated PDCCHs is smaller than M. Here, the LTE PUCCH format includes LTE PUCCH format 1a/1b, and ACK/NACK bundling defined for TDD or LTE PUCCH format 1b based channel selection (in other words, ACK/NACK multiplexing) defined for TDD can be used. A case in which M=1 is explained for convenience of description.

When a PDCCH is scheduled through a DL PCC, the LTE UE can transmit a PUCCH on a UL PCC using the LTE PUCCH format and rule. Since the LTE UE is already using PUCCH resources according to dynamic resource allocation, the LTE UE can efficiently operate the PUCCH resources without additional overhead when the number of scheduled PDCCHs is less than or equal to M (e.g. M=1).

However, when the PDCCH is scheduled to one of DL SCCs, resource collision may occur. It is assumed that DL PCC #0 is linked with UL PCC #0 for convenience of description. For example, if a PDCCH is not scheduled to DL PCC #0 and a PDCCH is scheduled to DL SCC #0 only, the LTE UE transmits ACK/NACK information using a PUCCH resource n_B corresponding to the lowest CCE index of the PDCCH transmitted on DL SCC #0 and the LTE PUCCH format. However, when a PUCCH resource corresponding to the lowest CCE index in DL PCC #0, which is assigned to another LTE UE, is n_B, resource collision occurs between the two UEs. To solve this problem, it is necessary to schedule PDCCHs for DL CCs such that the lowest CCE indexes of the PDCCHs do not overlap, which results in scheduling restriction.

The aforementioned resource collision can be avoided by defining resource indication information (e.g. an offset value) for a PDCCH transmitted on a DL SCC. For example, it is possible to solve the resource collision problem using a TPC field value as an offset value when the TPC field described in the above embodiment is used.

Alternatively, a specific state of the resource indication information may be used as an indicator for PUSCH piggyback. For example, when the resource indication information is transmitted using a 2-bit TPC field, [0 0], [0 1] and [1 0] can be used as resource indication information (e.g. offset values) for PUCCHs and [1 1] can be used as a PUSCH piggyback indicator. The PUSCH piggyback indicator can be used to dynamically perform UCI piggyback in a UE permitted to transmit PUCCH+PUSCH. However, usage of the PUSCH piggyback indicator is not limited thereto.

Embodiment 3: Resource Allocation for PUCCH Format 3 and LTE PUCCH Format

Resource allocation for PUCCH format 3 and resource allocation for the LTE PUCCH format may be used in connection with each other. In this case, the resource indication information (e.g. an offset value or TPC field) can be used as information for PUCCH format 3 when UCI is transmitted using PUCCH format 3 and be used as information for the LTE PUCCH format when the UCI is transmitted using the LTE PUCCH format.

Embodiment 4: Dynamic LTE Fallback Based on PDCCH on DL SCC

A specific bit in a PDCCH transmitted from a DL SCC can be used as an indicator to operate in an LTE PUCCH format based bundling mode. One of states of the resource indication information can indicate operating in the LTE bundling mode. The resource indication information can be transmitted using a TPC field of a DL SCC PDCCH. Here, bundling means an operation of feeding back a representative value to a BS through a logical AND operation (or logical OR operation) of fed back ACK/NACK information. That is, when the state of the resource indication information is enabled to a bundling mode, a UE can bundle multiple ACK/NACK signals to be transmitted using PUCCH format 3 into 1 bit (PUCCH format 1a, full ACK/NACK bundling) or 2 bits (PUCCH format 1b, bundling for each codeword). Here, one of the following resource allocation rules can be applied.

- A PUCCH resource can be allocated on the basis of the lowest CCE index of a PDCCH transmitted on a DL PCC.
- A PUCCH resource can be allocated on the basis of the lowest CCE index of the first PDCCH in the first (or last) DL CC indexes (logical or physical). The order of PDCCHs can be determined based on the sizes of the lowest CCE indexes.
- A PUCCH resource can be allocated on the basis of the lowest CCE index of the last PDCCH in the first (or last) DL CC indexes (logical or physical). The order of PDCCHs can be based on the sizes of the lowest CCE indexes of the PDCCHs.

Equation 11 represents an example of allocating a PUCCH resource on the basis of a lowest CCE index in LTE.

$$n_{PUCCH} = n_{CCE} + N_{PUCCH} \qquad \text{[Equation 11]}$$

Here, $n_{PUCCH}$ denotes PUCCH resource index, $n_{CCE}$ denotes the lowest CCE index of a PDCCH determined according to the above-mentioned rule, and $N_{PUCCH}$ represents a value signaled by a higher layer.

Figure 34:
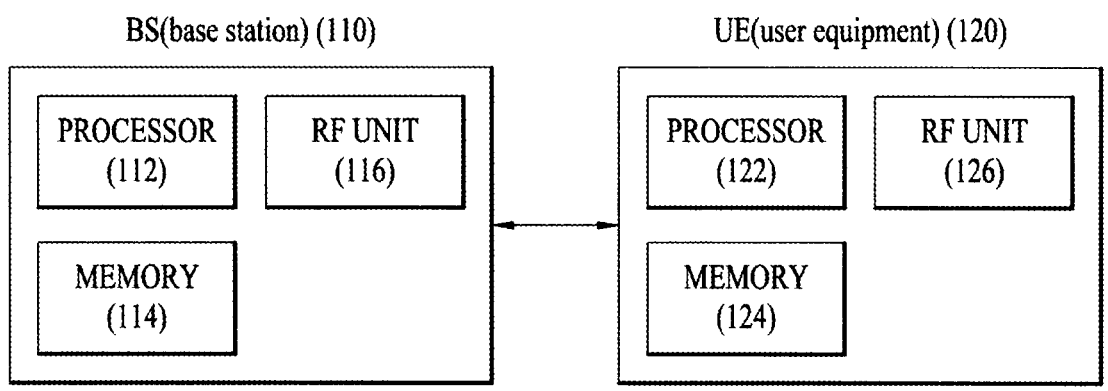
FIG. 34 illustrates configurations of a BS and a UE applicable to the present invention.

FIG. 34 is a block diagram showing configurations of a BS and a UE.

Referring to FIG. 34, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a UE, a BS or other devices in a wireless communication system. Specifically, the present invention is applicable to a method for transmitting uplink control information and an apparatus therefor.

The invention claimed is:

1. A method performed by a communication device in a wireless communication system, the method comprising:
   receiving information associated with a plurality of physical uplink control channel (PUCCH) resources through a higher layer signaling;
   modulating control information including acknowledgement/negative acknowledgement (ACK/NACK) to provide N modulation symbols;
   spreading a block of modulation symbols using an orthogonal sequence with a spreading factor M to provide a length-L spread modulation symbol sequence,
   wherein the block of modulation symbols includes L/M modulation symbols among the N modulation symbols, and L is a number of subcarriers in a resource block (RB);
   discrete fourier transforming the length-L spread modulation symbol sequence to provide a length-L complex-valued symbol sequence;
   mapping the length-L complex-valued symbol sequence to resource elements of an orthogonal frequency division multiplexing (OFDM)-based symbol for PUCCH; and
   transmitting the mapped length-L complex-valued symbol sequence through the OFDM-based symbol for the PUCCH,
   wherein a resource for the PUCCH is indicated by PUCCH resource information in a physical downlink control channel (PDCCH) associated with the ACK/NACK from among the plurality of PUCCH resources.

2. The method of claim 1, wherein M is 2.

3. The method of claim 1, wherein L is 12.

4. The method of claim 1, wherein the control information includes multiple ACK/NACKs for a plurality of data.

5. The method of claim 1, wherein the PUCCH resource includes at least one of a physical resource block index and an orthogonal sequence index.

6. The method of claim 1, wherein the PUCCH resource information is composed of 2 bits and indicates one of up to 4 PUCCH resources configured by a higher layer.

7. A communication device configured to operate in a wireless communication system, the communication device comprising:
   a transmitter and a receiver; and
   a processor operatively connectable to the transmitter and the receiver,
   wherein the processor is configured to perform operations comprising:
      receiving information associated with a plurality of physical uplink control channel (PUCCH) resources through a higher layer signaling;
      modulating control information including acknowledgement/negative acknowledgement (ACK/NACK) to provide N modulation symbols, spreading a block of modulation symbols using an orthogonal sequence with a spreading factor M to provide a length-L spread modulation symbol sequence, wherein the block of modulation symbols includes L/M modulation symbols among the N modulation symbols, and L is a number of subcarriers in a resource block (RB), discrete fourier transforming the length-L spread modulation symbol sequence to provide a length-L complex-valued symbol sequence, mapping the length-L complex-valued symbol sequence to resource elements of an orthogonal frequency division multiplexing (OFDM)-based symbol for PUCCH, and transmitting the mapped length-L complex-valued symbol sequence through the OFDM-based symbol for the PUCCH, wherein a resource for the PUCCH is indicated by PUCCH resource information in a physical downlink control channel (PDCCH) associated with the ACK/NACK from among the plurality of PUCCH resources.

8. The UE of claim 7, wherein M is 2.

9. The UE of claim 7, wherein L is 12.

10. The UE of claim 7, wherein the control information includes multiple ACK/NACKs for a plurality of data.

11. The UE of claim 7, wherein the PUCCH resource includes at least one of a physical resource block index and an orthogonal sequence index.

12. The UE of claim 7, wherein the PUCCH resource information is composed of 2 bits and indicates one of up to 4 PUCCH resources configured by a higher layer.

13. A communication device configured to operate in a wireless communication system, the communication device comprising:
- at least one processor; and
- at least one memory operably connectable to the at least one processor and storing instructions that, when executed by the at least one processor, perform operations comprising:
  - receiving information associated with a plurality of physical uplink control channel (PUCCH) resources through a higher layer signaling;
  - modulating control information including acknowledgement/negative acknowledgement (ACK/NACK) to provide N modulation symbols;
  - spreading a block of modulation symbols using an orthogonal sequence with a spreading factor M to provide a length-L spread modulation symbol sequence,
  - wherein the block of modulation symbols includes L/M modulation symbols among the N modulation symbols, and L is a number of subcarriers in a resource block (RB);
  - discrete fourier transforming the length-L spread modulation symbol sequence to provide a length-L complex-valued symbol sequence;
  - mapping the length-L complex-valued symbol sequence to resource elements of an orthogonal frequency division multiplexing (OFDM)-based symbol for PUCCH; and
  - transmitting the mapped length-L complex-valued symbol sequence through the OFDM-based symbol for the PUCCH,
  - wherein a resource for the PUCCH is indicated by PUCCH resource information in a physical downlink control channel (PDCCH) associated with the ACK/NACK from among the plurality of PUCCH resources.

14. The communication device of claim 13, wherein M is 2.

15. The communication device of claim 13, wherein L is 12.

16. The communication device of claim 13, wherein the control information includes multiple ACK/NACKs for a plurality of data.

17. The communication device of claim 13, wherein the PUCCH resource includes at least one of a physical resource block index and an orthogonal sequence index.

18. The communication device of claim 13, wherein the PUCCH resource information is composed of 2 bits and indicates one of up to 4 PUCCH resources configured by a higher layer.

* * * * *